United States Patent [19]
Yamasaki

[11] Patent Number: 5,838,075
[45] Date of Patent: Nov. 17, 1998

[54] ANTI-THEFT DEVICE FOR A VEHICLE

[75] Inventor: Takeshi Yamasaki, Kobe, Japan

[73] Assignee: Fujitsu Ten Limited, Kobe, Japan

[21] Appl. No.: 727,401

[22] PCT Filed: Apr. 14, 1995

[86] PCT No.: PCT/JP95/00737

§ 371 Date: Dec. 16, 1996

§ 102(e) Date: Dec. 16, 1996

[87] PCT Pub. No.: WO95/28301

PCT Pub. Date: Oct. 26, 1995

[30] Foreign Application Priority Data

Apr. 14, 1994 [JP] Japan ................................ 6-076077
Jun. 2, 1994 [JP] Japan ................................ 6-121503

[51] Int. Cl.$^6$ ................................................ B60R 25/04
[52] U.S. Cl. ................................ 307/10.3; 180/287
[58] Field of Search ................................ 307/10.1–10.6;
180/287; 340/425.5, 426, 825.69, 825.72;
364/423.098; 123/198 DB, 198 DC; 701/1

[56] References Cited

U.S. PATENT DOCUMENTS

| | | | |
|---|---|---|---|
| 4,955,453 | 9/1990 | Nishioka et al. . | |
| 4,958,084 | 9/1990 | Carlo et al. . | |
| 4,965,460 | 10/1990 | Tanaka et al. | 307/10.2 |
| 5,247,279 | 9/1993 | Sato | 340/426 |
| 5,539,260 | 7/1996 | Khangura et al. | 307/10.3 |
| 5,561,332 | 10/1996 | Udo et al. | 307/10.5 |
| 5,635,900 | 6/1997 | Hasegawa et al. | 340/426 |

FOREIGN PATENT DOCUMENTS

| | | |
|---|---|---|
| 60-229845 | 11/1985 | Japan . |
| 61-215457 | 9/1986 | Japan . |
| 63-255152 | 10/1988 | Japan . |
| 63-284054 | 11/1988 | Japan . |
| 1-127435 | 5/1989 | Japan . |
| 2-164648 | 6/1990 | Japan . |
| 2-299955 | 12/1990 | Japan . |
| 3-70299 | 3/1991 | Japan . |
| 4-11544 | 1/1992 | Japan . |
| 4-71949 | 3/1992 | Japan . |
| 4-331647 | 11/1992 | Japan . |
| 5-106375 | 4/1993 | Japan . |
| 5-131894 | 5/1993 | Japan . |
| 6-10063 | 2/1994 | Japan . |

OTHER PUBLICATIONS

Patent Abstracts of Japan, *Burglar–Proof Device for Electronically Controlled Hydraulic Machine*, JP 2–132233, May 21, 1990.

Patent Abstracts of Japan, *Combined Controller and Alarm for Starting of Automotive Engine*, JP–A–5713270, Jan. 23, 1982.

*Primary Examiner*—Richard T. Elms
*Attorney, Agent, or Firm*—Wenderoth, Lind & Ponack, L.L.P.

[57] ABSTRACT

In a vehicle control device having a so-called keyless entry system in which a door lock control unit controls a door lock actuator by receiving a signal representing an identification code and transmitted from a transmitter, an internal-combustion engine control unit computes fuel injection quantity and ignition timing from control data stored in a memory in response to detection results inputted from respective detectors, and thereby drives a fuel injection valve and an igniter. The door lock control unit detects whether a theft is attempted on the vehicle, based on the switching states of various switches, and supplies the result of the detection to a constant-voltage circuit in the internal-combustion engine control unit in the form of a code signal; when a theft is detected, power supply to respective circuits in the internal-combustion engine control unit is shut off. Furthermore, the internal-combustion engine control unit checks whether the identification code received by a receiver matches the identification code prestored in the memory, and if they do not coincide, inhibits the internal-combustion engine from starting. Since identification code data that cannot be created in a pseudo manner is inputted to the internal-combustion engine control unit, not a binary signal indicating whether to permit or not permit the starting of the internal-combustion engine, the vehicle can be reliably prevented from being burgled and driven away.

21 Claims, 13 Drawing Sheets

ANTI-THEFT DEVICE FOR A VEHICLE

TECHNICAL FIELD

The present invention relates to an anti-theft device for a vehicle, and more particularly to a device for preventing a vehicle from being driven away by a burglar.

BACKGROUND ART

There are various methods for preventing vehicle theft such as a method for preventing a vehicle from being burgled, a method for disabling a vehicle from steering by locking a steering wheel, and a method for disabling an internal-combustion engine from starting. In the method for preventing the vehicle from being burgled, an attempt to burgle the vehicle by prying a door or breaking a window is detected using, for example, a broken window detector or the like, to prevent the burglary by sounding an alarm, however, once the door is opened, the vehicle can be easily driven away by the burglar.

The method for disabling an internal-combustion engine from starting is effective in preventing a vehicle from being burgled and driven. A first prior art of such method is disclosed, for example, in Japanese Unexamined Patent Publication JP-A 4-11544 (1992). This prior art is characterized in that an anti-theft computer performs control so that a relay interposed in an ignition coil line is deenergized to inhibit the internal-combustion engine from starting.

A second prior art method is disclosed in Japanese Unexamined Patent Publication JP-A 4-331647 (1992). This prior art method uses an anti-theft control unit which operates to deenergize a relay interposed in a power supply line from the battery to the load and thereby inhibit the internal-combustion engine from starting.

Thus these two prior art methods disable the internal-combustion engine from starting by deenergizing the relay inserted in the load line. These methods, therefore, require a large-size expensive relay, and particularly in the case of the first prior art, an expensive high-voltage relay that can be inserted in an ignition coil line, resulting in an increase in cost. Furthermore, persons experienced in vehicle electronics would be able to easily defeat the anti-theft function by short-circuiting the input and output of the relay.

A third prior art method that overcomes these problems is disclosed in Japanese Unexamined Patent Publication JP-A 63-284054(1988). In this prior art, the internal-combustion engine is stopped if a gear shift operation is performed without a person's sitting on the driver's seat which is folded backward or without entering an identification code.

A fourth prior art method is disclosed in Japanese Unexamined Patent Publication JP-A 2-164648 (1990). This prior art is intended to prevent vehicle theft in case the driver forgot to remove the ignition key; that is, after a predetermined time has elapsed from the time the internal-combustion engine was stopped, the internal-combustion engine can be started only when a correct password is entered.

Thus, the third and fourth prior art methods do not require inserting a relay or the like in an aftermarket fashion in an originally installed internal-combustion engine control unit, etc. as in the first and second prior art, but are designed to stop the control operation of the control unit itself.

However, neither the third nor the fourth prior art provides specific details about the method of stopping the internal-combustion engine after detecting a theft, though detailed explanations are given about the detection of the theft. Accordingly, the third and fourth prior art may also involve the same problems as described in connection with the first and second prior art. The present invention, on the other hand, is intended to prevent theft reliably by proposing a specific configuration for stopping the internal-combustion engine when a theft is detected.

Furthermore, both the third and fourth prior art methods use a dedicated microcomputer for verifying the identification code, the configuration being such that only when the identification code has been verified, the microcomputer sends a binary signal to an internal-combustion engine control computer to permit the internal-combustion engine to start. Therefore, persons experienced in vehicle electronics would be able to start the internal-combustion engine by creating the binary permit signal in a pseudo manner, such as by connecting the line for transmitting the permit signal, for example, to the Vcc line of 5 V or to the grounding line.

Further, in the case of a configuration where the identification code is transmitted from a transmitter, the identification code in the receiver or identifying means must be made rewritable so that it can be used with a new transmitter in case the original transmitter is lost or damaged. A fifth prior art is disclosed in Japanese Unexamined Patent Publication JP-A 3-70299 (1991) previously proposed by the present applicant. In this prior art, switching between an identification code write operation and read operation is made depending on the time that a switch on the receiver is being operated.

A sixth prior art that also makes the identification code rewritable is disclosed in Japanese Unexamined Patent Publication JP-A 5-106375 (1993). This prior art enables the identification code to be altered by an input operation from an input section when the ignition switch is turned on.

Accordingly, the fifth prior art requires the provision of a switch to make the identification code rewritable, while the sixth prior art poses a problem in that the identification code can be easily altered.

It is an object of the present invention to provide a vehicle anti-theft device that can prevent vehicle theft reliably.

It is another object of the invention to provide a vehicle anti-theft device wherein rewriting of the identification code can be accomplished using a simple construction and with reliability.

SUMMARY OF THE INVENTION

The invention provides an anti-theft device for a vehicle, comprising:

a control means for controlling operating conditions of an internal-combustion engine;

a power supply means for stabilizing power from a battery and supplying the power to the control means; and a detection means for making the power supply means stop a function of power supply to the control means when a theft of the vehicle is detected.

The invention is characterized in that:

a short-circuiting means is interposed between a power supply line from the power supply means to the control means and a grounding line;

the detection means short-circuits the short-circuiting means when a theft is detected; and the power supply means stops the function of power supply to the control means by an overcurrent resulting from the short-circuiting.

The invention also provides an anti-theft device for a vehicle, comprising:

a control means for controlling operating conditions of an internal-combustion engine;

an initializing means provided in relation to the control means, for initializing the control means at the time when a supply voltage rises and for making calculation of control amounts possible; and a detection means for inhibiting the initialization of the control means by the initializing means when a theft of the vehicle is detected.

The invention also provides an anti-theft device for a vehicle, comprising:

a control means for controlling at least either fuel injection quantity or ignition timing of an internal-combustion engine;

a detection means for making the control means stop outputting of at least either of an injection signal and an ignition signal to the internal-combustion engine, when a theft of the vehicle is detected.

The invention also provides an anti-theft device for a vehicle, comprising:

a control means for controlling at least either fuel injection quantity or ignition timing of an internal-combustion engine;

a backup control means provided in relation to the control means, for supplying a fixed backup injection signal or a fixed backup ignition signal to the internal-combustion engine when it is detected that an injection signal or an ignition signal to the internal-combustion engine has stopped; and a detection means for detecting a theft of the vehicle, wherein, when the theft is detected by the detection means, the control means shortens at least either the injection signal or the ignition signal to a predetermined infinitesimal time.

The invention is characterized in that the control means performs the shortening of the injection signal or the ignition signal when vehicle speed reaches or exceeds a predetermined value after detection of the theft of the vehicle.

The invention also provides an anti-theft device for a vehicle, comprising:

a detector provided in relation to an internal-combustion engine, for detecting control parameters of the internal-combustion engine;

a control means for calculating a control amount based on a detection result from the detector, and for supplying a control output to the internal-combustion engine;

a detection means for detecting a theft of the vehicle; and a shut-off means interposed between the detector and the control means, for shutting off an output from the detector when the theft is detected by the detection means.

The invention also provides an anti-theft device for a vehicle, comprising:

a detector provided in relation to an internal-combustion engine, for detecting control parameters of the internal-combustion engine;

a control means for calculating a control amount based on a detection result from the detector, and for supplying a control output to the internal-combustion engine;

a detection means for detecting a theft of the vehicle; and a shut-off means interposed in a power supply line to the detector, for shutting off the power supply line when the theft is detected by the detection means.

The invention is characterized in that the detection means transmits the detection result in the form of a code signal.

The invention also provides an anti-theft device for a vehicle, comprising:

a control means for controlling operating conditions of an internal-combustion engine;

a storage means having a storage area for data relating to the control of the operating conditions of the internal-combustion engine and a storage area for an identification code; and an input means to which an identification code is inputted by a predetermined operation, wherein, when energization of the control means is started with an attempt to start the internal-combustion engine, the control means compares the identification code inputted from the input means with the identification code stored in the storage means, and when they do not coincide, the control means inhibits the internal-combustion engine from starting.

The invention is characterized in that the comparison operation is performed again when a rotational speed of the internal-combustion engine is not higher than a predetermined value, a vehicle speed is not higher than a predetermined value, and a shift lever of a transmission is in a parking or neutral position.

The invention is also characterized in that, when a vehicle speed is not lower than a predetermined value, starting of the internal-combustion engine is permitted regardless of a result of the comparison between the identification codes.

The invention is also characterized in that, when parameters to be used to control the internal-combustion engine are inputted in a combination that cannot occur during a usual operation of the internal-combustion engine, the control means writes the identification code inputted to the input means, into the storage means.

According to the invention, a detection means for detecting vehicle theft is provided in relation to control means for controlling internal-combustion engine operating conditions such as fuel injection quantity and ignition timing. Power from a battery is stabilized by power supply means and supplied to the control means. Upon detecting a theft, for example, when an attempt is made to start the internal-combustion engine despite a dissidence between the pre-stored identification code of the vehicle and the input identification code such as a password, the detection means makes the power supply means stop the supply of power to the control means.

More specifically, the power supply means performs so-called constant-voltage control by controlling the base current of a transistor, inserted in series to the power line from the battery to the control means, in proportion to an output voltage of the transistor. Accordingly, when a vehicle theft is detected, power supply to the control means ceases. In this way, vehicle theft can be reliably prevented without requiring a large-size component such as a relay.

Preferably, a short-circuiting means is interposed between the power supply line from the power supply means to the control means and the grounding line, and the detection means causes the short-circuiting means to activate upon detection of a theft. To protect the power supply means from the overcurrent resulting from the short-circuiting, the power supply means cuts off the base current of the transistor, for example, and the power to the control means is thus cut off. In this way, the power supply function can be disabled using a simple construction by just providing short-circuiting means.

Furthermore, according to the invention, an initializing means is provided in relation to the control means. The initializing means initializes the control means by supplying an initialization signal or the like to the control means when the supply voltage rises, and the calculation of control amounts such as the fuel injection quantity and ignition timing is thus made possible. When a vehicle theft is detected, the detection means inhibits the initialization of the control means by the initializing means. Accordingly, when a theft is detected, the control means cannot perform the calculation of the control amounts even after the supply voltage has risen. Vehicle theft can thus be prevented reliably.

According to the invention, when a theft is detected by the detection means, the control means for controlling at least either the fuel injection quantity or ignition timing of the internal-combustion engine is made to stop an output of at least either the injection signal or the ignition signal to the internal-combustion engine.

Furthermore, according to the invention, a backup control means is provided in addition to the control means that controls at least either the fuel injection quantity or ignition timing of the internal-combustion engine. In the event of a failure of the control means or at the time of staring with low voltage, for example, the backup control means controls the fuel injection quantity and ignition timing to predetermined fixed values, permitting emergency driving, etc. to a repair shop. The backup control means supplies a backup injection signal or backup ignition signal to the internal-combustion engine when it is detected that the output of the injection signal or ignition signal from the control means to the internal-combustion engine has stopped.

When a vehicle theft is detected by the detection means, the control means shortens at least either the injection signal or the ignition signal to a predetermined infinitesimal time. Accordingly, since the injection signal or ignition signal from the control means is not completely stopped, the backup control means does not output the backup injection signal or backup ignition signal; furthermore, when the injection signal or ignition signal is shortened to an infinitesimal time, as described above, the air-fuel mixture in the combustion chamber does not ignite. In this way, vehicle theft can be prevented reliably.

Preferably, the control means uses vehicle speed as a criterion for shortening the injection signal or ignition signal; that is, when the vehicle speed reaches or exceeds a predetermined value after detection of the vehicle theft, the control means performs the shortening operation. In this way, the anti-theft action can be put into operation only when the vehicle being stolen is started to be driven away.

According to the invention, in an internal-combustion engine control unit in which control parameters such as intake pressure and internal-combustion engine rotating speed are detected by a detector and, based on the detection results, a control means performs calculation of control amounts, detection means for detecting vehicle theft is provided, and when a theft is detected by the detection means, shut-off means, such as a switch interposed between the detector and the control means, is shut off. Since the detector output is not inputted to the control means, the control means cannot calculate the control amounts and the internal-combustion engine cannot be started. Vehicle theft can thus be prevented reliably.

Furthermore, according to the invention, the shut-off means is inserted in the power supply line to the detector, and calculation of the control amounts is rendered impossible by disabling the detector output by stopping the power supply from the power source.

Also preferably, the result of the detection as to whether the vehicle is being stolen or not is sent to the control means or the short-circuiting means in the form of a code signal. It is therefore not possible to reproduce such a code signal by simply setting the line from the detection means to the control means or the short-circuiting means to a high level or low level, attempting to input the result of the detection in a pseudo manner. In this way, vehicle theft can be prevented further reliably.

According to the invention, an input means is provided in relation to a control means provided for controlling internal-combustion engine operating conditions such as fuel injection quantity and ignition timing. An identification code is inputted to the input means, for example, as a signal from a special transmitter or by a predetermined key operation. Also provided in relation to the control means is storage means for storing data relating to the control of the internal-combustion engine operating conditions, such as map data of injection quantity corresponding to the measured intake pressure, internal-combustion engine rotational speed, etc. This storage means has an identification code storage area in addition to a storage area for the above data.

When energization of the control means is started, that is, when the ignition key is connected, for example, to a start contact to start the internal-combustion engine, the control means compares the identification code inputted via the input means with the identification code stored in the storage means, and when they coincide, permits the starting of the internal-combustion engine, allowing the internal-combustion engine to be started by energizing the starter motor, for example. On the other hand, when the identification codes do not coincide, starting of the internal-combustion engine is inhibited, for example, by stopping fuel injection or by disabling the output of the ignition signal.

Not a binary signal indicating whether to permit or not permit internal-combustion engine starting as described in the prior art, but an identification code is inputted to the control unit and compared with the identification code stored in the storage means provided in relation to the control unit. Accordingly, it is not possible even for persons experienced in vehicle electronics to create a pseudo signal corresponding to the identification code. In this way, when the identification codes do not coincide, starting of the internal-combustion engine is reliably inhibited to prevent the theft.

Preferably, the control means performs the comparing operation again when the rotational speed of the internal-combustion engine is not higher than a predetermined value, for example, 800 rpm, the vehicle speed is at a predetermined value, for example, 0 km/h, and the shift lever of the transmission is in the neutral or parking position. Therefore, even if an erroneous decision was made and the starting of the internal-combustion engine was not permitted during the operation to start the internal-combustion engine, the internal-combustion engine can be started if the identification codes coincide as a result of the rejudgement in the state where the above-mentioned conditions are satisfied. The fail-safe function can thus be expanded.

Also preferably, when the vehicle speed is higher than a predetermined value, the control means permits the starting of the internal-combustion engine regardless of the result of the comparison of the identification codes, allowing the internal-combustion engine to be restarted quickly in the event of an internal-combustion engine stall during driving.

Further preferably, when parameters to be used to control the internal-combustion engine are inputted in a combination that cannot occur during usual operation of the internal-combustion engine, for example, when such states that the neutral switch is in the OFF state, namely the vehicle is in a running state, and the starter signal is at the high level, namely the starter motor is being driven are simulated and parameters representing such conditions are inputted to the control means, the control means writes the identification code inputted to the input means, directly to the storage means.

In this way, rewriting of the identification code, which becomes necessary, for example, when the transmitter is lost, can be accomplished using a simple construction without having to provide a switch or the like on the control means. Furthermore, since inadvertent rewriting is prevented, vehicle theft can be prevented reliably.

BEST MODE FOR CARRYING OUT THE INVENTION

Figure 1:
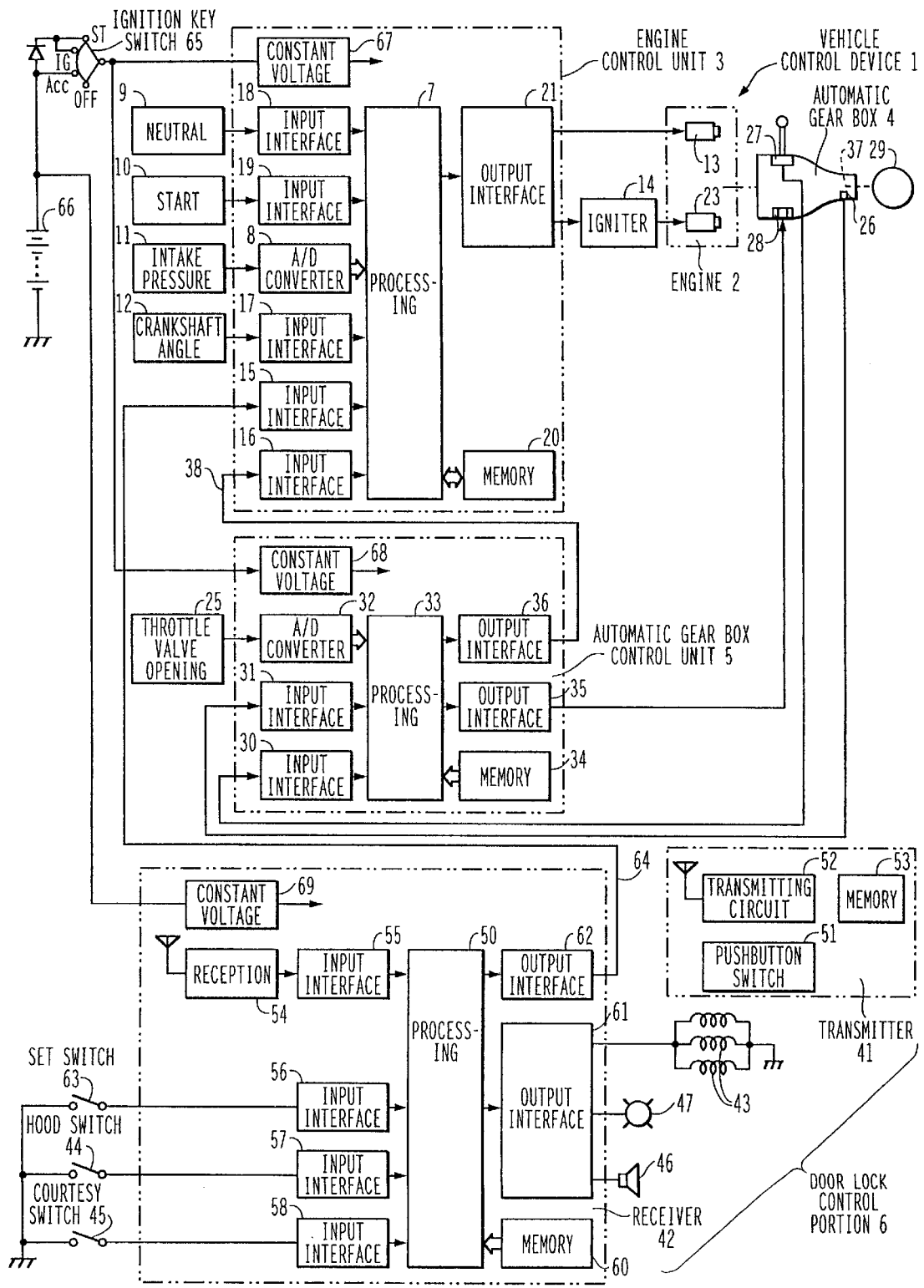
FIG. 1 is a block diagram showing the electrical configuration of a vehicle control device 1 equipped with an anti-theft function of one embodiment of the present invention.

FIG. 1 is a block diagram showing the electrical configuration of a vehicle control device 1 equipped with an anti-theft function of one embodiment of the invention. The vehicle control device 1 substantially comprises an internal-combustion engine control unit 3 for controlling an internal-combustion engine 2, an automatic transmission control unit 5 for controlling an automatic transmission 4, and a door lock control unit 6.

Substantially, the internal-combustion engine control unit 3 computes fuel injection quantity and ignition timing based on the intake pressure of the internal-combustion engine 2 detected by an intake pressure detector 11, and the rotational speed of the internal-combustion engine 2 detected by a crank angle detector 12, etc., and thereby drives a fuel injection valve 13 and an igniter 14. The internal-combustion engine control unit 3 comprises input interface circuits 16 to 19, an analog/digital converter 8, a processing circuit 7 implemented by a microcomputer, etc., a memory 20 implemented by an erasable rewritable read-only memory such as a so-called EEPROM or the like, and an output interface circuit 21.

An output from the intake pressure detector 11 is converted by the analog/digital converter 8 into a digital value, which is read into the processing circuit 7. A crank pulse from the crank angle detector 12 is inputted to the processing circuit 7 after waveform-shaping in the input interface circuit 17. The input interface 16 is provided to receive a signal from the automatic transmission control unit 5.

Outputs from a neutral switch 9 and a start switch 10 also are inputted to the processing circuit 7 after waveform-shaping in the respective input interface circuits 18 and 19. The neutral switch 9 conducts when the shift lever of the automatic transmission 4 is in the parking or neutral position. The starter switch 10 conducts while the starter motor is being driven.

Based on the detection results from the switches 9, 10 and the detectors 11, 12, the signal from the automatic transmission control unit 5, etc., the processing circuit 7 computes the fuel injection quantity, ignition timing, etc. by referencing map data, etc. stored in the memory 20, and thereby controls the ignition timing and ignition time of a spark plug 23 via the igniter 14 and also the valve opening time of the fuel injection valve 13 via the output interface circuit 21 implemented by a power transistor, etc.

Essentially, the automatic transmission control unit 5 selectively drives a solenoid valve 28 in the automatic transmission 4 in response to the detection results from a throttle valve opening detector 25, a vehicle speed detector 26, and a shift position detector 27, and transmits the drive force from the internal-combustion engine 2 to a drive wheel 29 after reduction by a desired reduction ratio. The automatic transmission control unit 5 comprises input interface circuits 30 and 31, an analog/digital converter 32, a processing circuit 33, a memory 34, and output interface circuits 35 and 36.

The vehicle speed detector 26 detects the rotational speed of a propeller shaft 37. Speed pulses from the vehicle speed detector 26 are waveform-shaped in the input interface circuit 31, and then inputted to the processing circuit 33 implemented by a microcomputer, etc. The shift position of the automatic transmission 4 is read by the shift position detector 27, and is inputted to the processing circuit 33 via the input interface circuit 30. The detection result from the throttle valve opening detector 25, which, is implemented using a potentiometer or the like, is converted by the analog/digital converter 32 into a digital value, which is inputted to the processing circuit 33.

Based on the shift position detected by the shift position detector 27, the throttle valve opening detected by the throttle valve opening detector 25, and the vehicle speed detected by the vehicle speed detector 26, the processing circuit 33 reads optimum gear from shift maps stored in the memory 34 implemented by a read-only memory or the like, and performs control to select the appropriate solenoid valve 28 via the output interface circuit 35 implemented by a power transistor, etc. to achieve shifting into the desired gear.

The processing circuit 33 supplies the previously mentioned signal to the input interface circuit 16 in the internal-combustion engine control unit 3 through the output interface circuit 36 and a line 38. This signal represents the vehicle speed and shift timing. The internal-combustion engine control unit 3 reduces shift shocks, for example, by temporarily delaying the ignition timing in coordination with the shift timing.

The door lock control unit 6 includes a receiver 42 which drives a door lock actuator 43 in response to a signal from a transmitter 41. When a theft is detected by a switch 44 or 45, the receiver 42 performs an anti-theft action by sounding a horn 46 and flashing a stop signal indicator light 47 at the same time.

The transmitter 41 comprises a pushbutton switch 51, a transmitting circuit 52, and a memory 53. When the pushbutton switch 51 is operated, the transmitting circuit 52 reads the identification code unique to the transmitter 41 from the memory 53 implemented by a read-only memory or the like, and transmits a signal representing the identification code to the receiver 42 via a frequency- or amplitude-modulated wave or via infrared light.

The receiver 42 comprises a receiving circuit 54, input interface circuits 55 to 58, a processing circuit 50, a memory 60, and output interface circuits s61 and 62. The signal representing the identification code and received by the receiving circuit 54 is waveform-shaped in the input interface circuit 55 before being inputted to the processing circuit 50 implemented by a microcomputer, etc. The processing circuit 50 determines whether the identification code matches the identification code of the vehicle stored in the memory 60 implemented by a read-only memory or the like, and when they coincide, drives through the output interface circuit 61 the actuator 43 implemented by an electromagnetic solenoid or the like. That is, when the doors and trunk are in locked position, an unlocking operation is performed, and when they are in unlocked position, a locking operation is performed.

Outputs from the switches 63, 44, and 45, with chattering components removed by the respective input interface circuits 56, 57, and 58, are inputted to the processing circuit 50. With the set switch 63 conducting and thus activating the anti-theft function, when the opening of the hood or door is detected by the hood switch 44 for detecting the opening/closing of the internal-combustion engine hood or by the courtesy switch 45 for detecting the opening/closing of the door, the processing circuit 50 sounds the horn 46 while flashing the stop signal indicator light 47, in the same manner as previously described, thus performing the theft prevention operation.

When a theft is detected, as will be described later, the processing circuit 50 also outputs a code signal indicating the detection of theft to a constant-voltage circuit 67 in the internal-combustion engine control unit 3 through the output interface circuit 62 and via a line 64.

The control units 3, 5, and 6 are also provided with constant-voltage circuits 67, 68, and 69, respectively. When an ignition key switch 65 is connected to an IG contact or ST contact, power from a battery 66 is supplied to the constant-voltage circuits 67 and 68 to energize the circuits in the control units 3 and 5. Power from the battery 66 is constantly supplied to the constant-voltage circuit 69 to energize the circuits in the receiver 42 in the door lock control unit 6.

Figure 2:
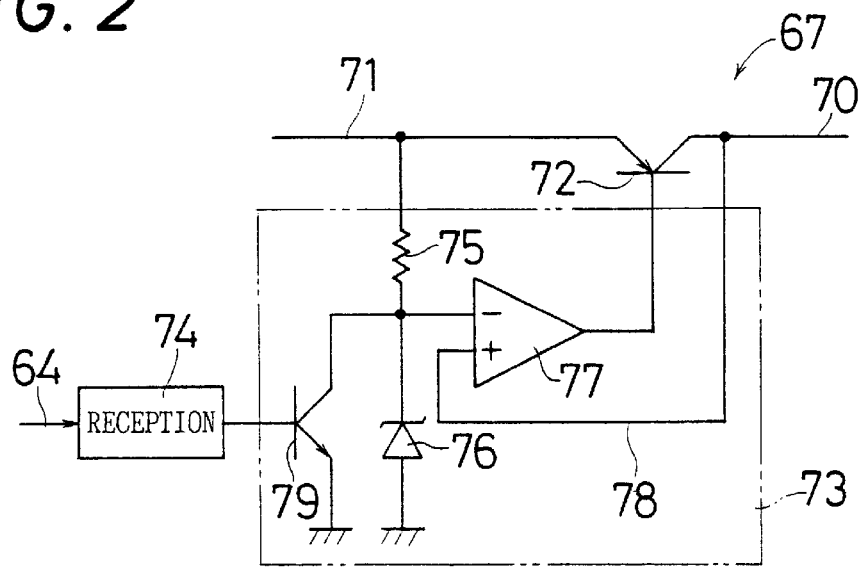
FIG. 2 is an electric circuit diagram showing a detailed configuration of a constant-voltage circuit 67.

FIG. 2 is an electric circuit diagram showing the detailed configuration of the constant-voltage circuit 67. The constant-voltage circuit 67 comprises a transistor 72 inserted in series in a power supply line 71 from the ignition key switch 65 to the respective circuits in the internal-combustion engine control unit 3, a constant-voltage control block 73 for controlling the base current of the transistor 72, and a receiver 74 for decoding the code signal indicating the result of theft detection from the door lock control unit 6, and for supplying an output corresponding to the result of the detection to the constant-voltage control block 73.

The constant-voltage control block 73 is implemented by an integrated circuit or the like, and comprises: a resistor 75 and a Zener diode 76, interposed between the power supply line 71 and grounding line, for creating a reference voltage; a comparator 77 for comparing the supply voltage to the circuits in the internal-combustion engine control unit 3, which is applied from the power supply line 70 via a line 78, with the reference voltage which is inputted from a node between the resistor 75 and Zener diode 76 and controlling the base current of the transistor 72 in correspondence to the comparison results ; and a transistor 79 inserted in parallel with the Zener diode 76.

When the code signal indicating a vehicle theft is inputted to the receiver 74 via the line 64 from the output interface circuit 62 in the door lock control unit 6, the receiver 74 produces a high level output which is applied to the base of the transistor 79. This causes the transistor 79 to conduct, as a result of which the reference voltage input from the node between the resistor 75 and Zener diode 76 to the comparator 77 becomes nearly equal to ground potential. The comparator 77 thus stops sinking the base current of the transistor 72, cutting off power supply to the circuits in the internal-combustion engine control unit 3.

On the other hand, when no theft is detected, the receiver 74 produces a low level output, causing the transistor 79 to turn off, so that the comparator 77 sinks the base current of the transistor 72 in correspondence to the difference between the reference voltage, obtained by tapping the power supply line 71, and the supply voltage to the respective circuits, and supplies a desired voltage, for example, a constant voltage of 5 V, to the respective circuits.

By cutting off power supply to the circuits in the internal-combustion engine control unit 3 upon detection of a theft, as described above, the output of an injection signal to the fuel injection valve 13 and the output of an ignition signal to the igniter 14 are stopped, thus reliably inhibiting the internal-combustion engine 2 from starting.

Furthermore, since the result of the detection as to whether the vehicle is being stolen or not is inputted in the form of a code signal from the door lock control unit 6 to the constant-voltage circuit 67, it is not possible to reproduce the code signal by simply setting the line 64 to a high level or low level, attempting to input a code signal in a pseudo manner. This further ensures the effectiveness of the theft prevention.

Figure 3:
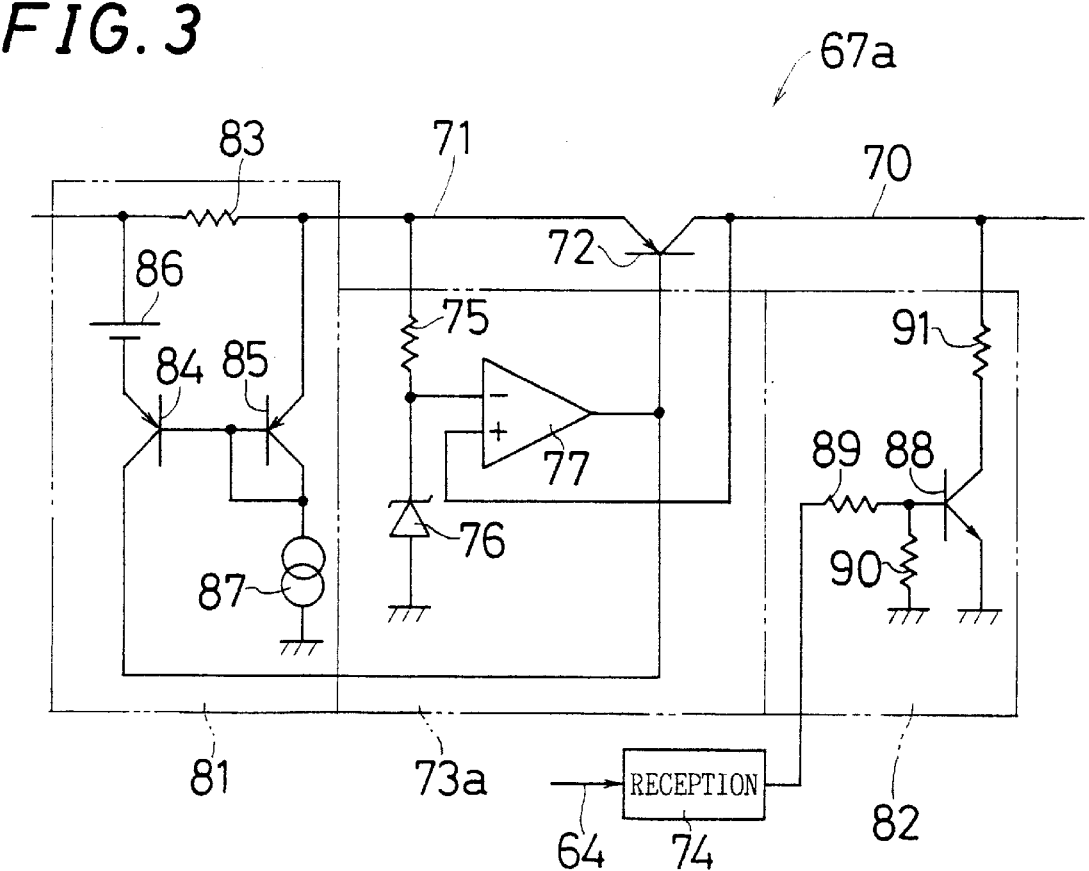
FIG. 3 is an electric circuit diagram showing a constant-voltage circuit 67a of another embodiment of the invention.

FIG. 3 is an electric circuit diagram showing a constant-voltage circuit 67a according to another embodiment of the invention. This circuit is similar to the constant-voltage circuit 67, and corresponding parts are designated by the same reference numerals. The constant-voltage circuit 67a is characterized by the provision of a constant current control block 81 and a muting circuit 82 in addition to the constant-voltage control block 73*a*. The constant current control block 81 comprises a shunt resistor 83 inserted in the power supply line 71, a pair of transistors 84 and 85 forming a current mirror circuit, a constant-voltage source 86, and a constant current source 87. The terminal voltages of the shunt resistor 83 are applied to the respective emitters of the transistors 84 and 85. The constant-voltage source 86 is interposed between the emitter of the transistor 84 and the shunt resistor 83. The base and collector of the transistor 85 are grounded via the constant current source 87, while the collector of the transistor 84 is connected to the base of the transistor 72.

Accordingly, when the current passing through the shunt resistor 83 increases, and the voltage drop across the shunt resistor 83 exceeds the voltage across the constant-voltage source 86, for example, 250 mV, the current flowing through the transistor 84 becomes larger than the collector current of the transistor 85 regulated by the constant current source 87, as a result of which the amount of sinking of the base current of the transistor 72 by the comparator 77 decreases and the transistor 72 is turned off. In this way, the constant current control block 81 has the function of stopping the power supply to the respective circuits when an overcurrent occurs.

On the other hand, the muting circuit 82 comprises a transistor 88 and resistors 89 to 91. The output of the receiver 74 is coupled to the base of the transistor 88 via the voltage-dividing resistors 89 and 90. The collector of the transistor 88 is connected to the power supply line 70 via the current-limiting resistor 91, while the emitter thereof is grounded.

Accordingly, when the code signal indicating the detection of theft is received from the door lock control unit 6, the receiver 74 produces a high level output by which the transistor 88 conducts and the current to be supplied to the respective circuits in the internal-combustion engine control unit 3 via the power supply line 70 is cut off. At the same time, the constant current control block 81 detects an overcurrent and the transistor 72 is turned off, thus reliably cutting the power supply to the respective circuits. Starting of the internal-combustion engine 2 can thus be prevented with simple construction by using the overcurrent detection function of the constant current control block 81.

Figure 4:
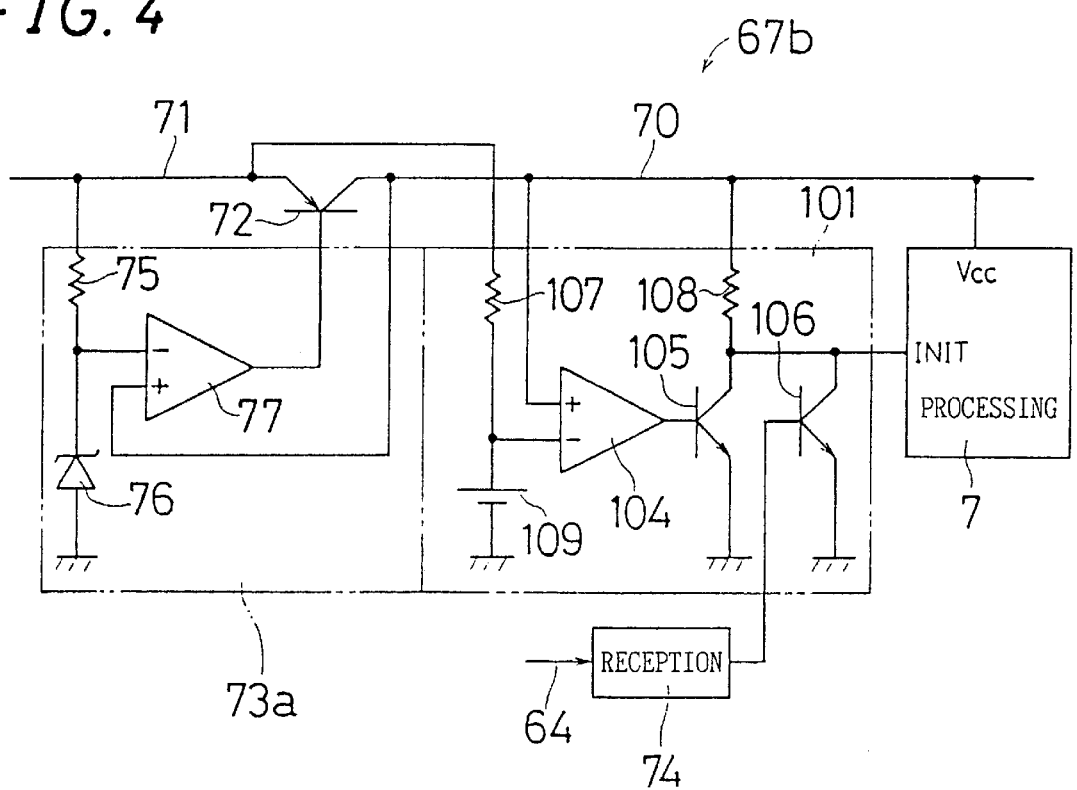
FIG. 4 is an electric circuit diagram showing a constant-voltage circuit 67b of another embodiment of the invention.

FIG. 4 is an electric circuit diagram showing a constant-voltage circuit 67*b* according to still another embodiment of the invention. The constant-voltage circuit 67*b* comprises the constant-voltage control block 73*a* and an initializing circuit 101 as an example of an initializing means. The initializing circuit 101 comprises a comparator 104, transistors 105 and 106, resistors 107 and 108, and a reference voltage source 109.

The voltage to be supplied to the respective circuits such as the processing circuit 7 in the internal-combustion engine control unit 3 is applied to the noninverting input terminal of the comparator 104 from the collector of the transistor 72 via the line 70. On the other hand, the voltage of the power supply line 71 is applied through the input resistor 107 to the inverting input terminal of the comparator 104 which is also supplied with a reference voltage Vref from the reference voltage source 109, the reference voltage being sufficiently lower than the voltage of the power supply line 71 when the ignition key switch 65 is conducting. When the voltage at the inverting input terminal is higher than the voltage at the noninverting input terminal, the comparator 104 produces a high level output and applies to the base of the transistor 105. The transistor 105 is connected to the power supply line 70 via the pull-up resistor 108 and also to an initializing terminal INIT on the processing circuit 7. Connected in parallel with the transistor 105 is the transistor 106 which is controlled to conduct or turn off by an output from the receiver 74. When the initializing terminal INIT is at a high level, the processing circuit 7 is enabled to perform computations.

Figure 5:
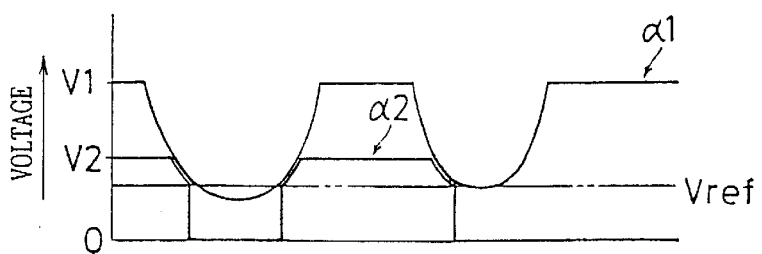
FIG. 5 is a waveform diagram for explaining the operation of the embodiment shown in FIG. 4.
Figure 5:

In the above-configured constant-voltage circuit 67*b*, when the voltage of the power supply line 71 varies as shown by reference signal in FIG. 5(1), the voltage of the power supply line 70 varies as shown by reference sign a2. That is, when the power supply line 71 is at a predetermined voltage V1, the voltage of the power supply line 70 is stabilized at V2. When the voltage of the power supply line 71 drops, and the voltage of the power supply line 70 drops below the reference voltage Vref supplied from the reference voltage source 109, the comparator 104 produces a high level output, causing the transistor 105 to conduct. As a result, the initializing terminal INIT on the processing circuit 7 is brought to a low level, and the operation of the processing circuit 7 stops.

Even when the voltage of the power supply line 71 rises nearly to the voltage V1, if the receiver 74 is producing a high level output indicating the detection of a theft, as shown in FIG. 5(2), the transistor 106 conducts and the potential of the initializing terminal INIT is held at the low level.

In this way, upon detection of a theft, the internal-combustion engine 2 can be prevented from being started by inhibiting the initializing operation of the processing circuit 7 and rendering the calculation of control amounts impossible.

Figure 6:
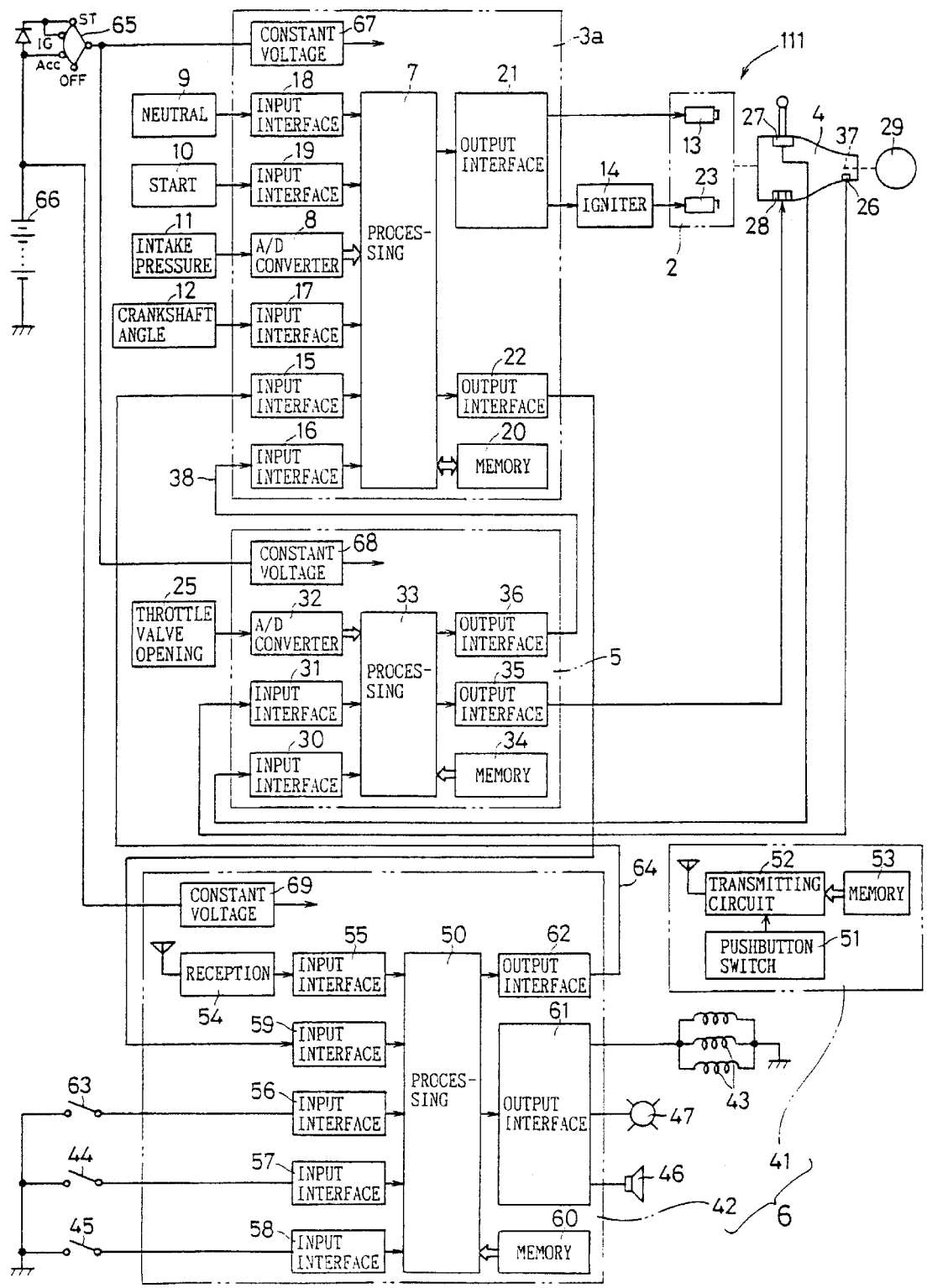
FIG. 6 is a block diagram showing the electrical configuration of a vehicle control device Ill of another embodiment of the invention.

FIG. 6 is a block diagram showing the electrical configuration of a vehicle control device 111 according to another embodiment of the invention. This embodiment is similar to the foregoing embodiment, and corresponding parts are designated by the same reference numerals. This embodiment is characterized in that the code signal indicating the result of theft detection, which is outputted from the output interface circuit 62 in the door lock control unit 6 via the line 64, is inputted to the processing circuit 7 in the internal-combustion engine control unit 3*a* via the input interface circuit 15.

For this purpose, an output interface circuit 22 is provided in the internal-combustion engine control unit 3*a* and an input interface unit 6. More specifically, when a transmit request is outputted from the processing circuit 7 via the output interface circuit 22, the processing circuit 50 receives the transmit request via the input interface circuit 59, and outputs the code signal, as described above.

When no theft is detected from the thus received code signal, a flag F indicating whether a theft is detected or not is reset to 0, and the processing circuit 7 calculates the fuel injection quantity based on the intake pressure, the rotational speed of the internal-combustion engine 2, etc., as previously described, and outputs an injection signal so that the fuel injection valve 13 is opened for a time corresponding to the calculated result. On the other hand, when a theft is detected, the flag F is set to 1, and the time of the injection signal is shortened to a predetermined fixed value.

Figure 7:
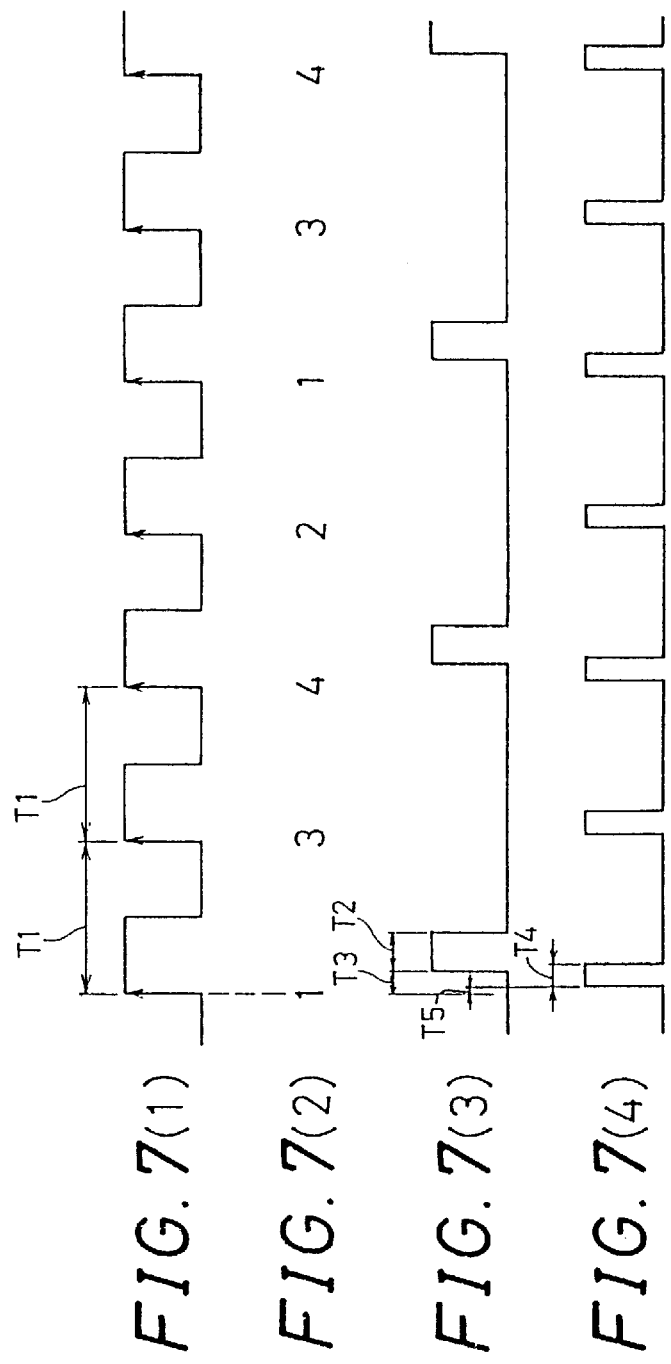
FIG. 7 is a waveform diagram for explaining the operation of the vehicle control device 111.

More specifically, when the internal-combustion engine 2 is a four-cylinder, four-cycle internal-combustion engine, for example, a crank pulse such as shown in FIG. 7(1) is inputted to the processing circuit 7 for every cycle of 180° crank angle. In FIG. 7(1), the cycle is indicated by reference sign T1. Based on the cycle T1, the intake pressure detected by the intake pressure detector 11, etc., the processing circuit 7 calculates the fuel injection quantity and fuel injection timing by referencing the map data, etc. stored in the memory 20. In accordance with the thus obtained injection quantity and injection timing, valve opening time T2 and time T3 measured from the nearest rising timing of the crank pulse are determined, and an injection signal that changes as shown in FIG. 7(3) is outputted when the respective times have elapsed from the rising timing. On the other hand, when a theft is detected, the valve opening time T2 is set to 0.

The injection signal shown in FIG. 7(3) is an example of the injection signal for the so-called simultaneous injection manner in which only one fuel injection valve 13 is provided in the internal-combustion engine 2 for common delivery of fuel into all cylinders. Accordingly, in the case of the so-called individual injection system in which the fuel injection valve 13 is provided for each individual cylinder, the fuel injection signal is sequentially outputted in correspondence with the cylinder numbers shown in FIG. 7(2).

Figure 8:
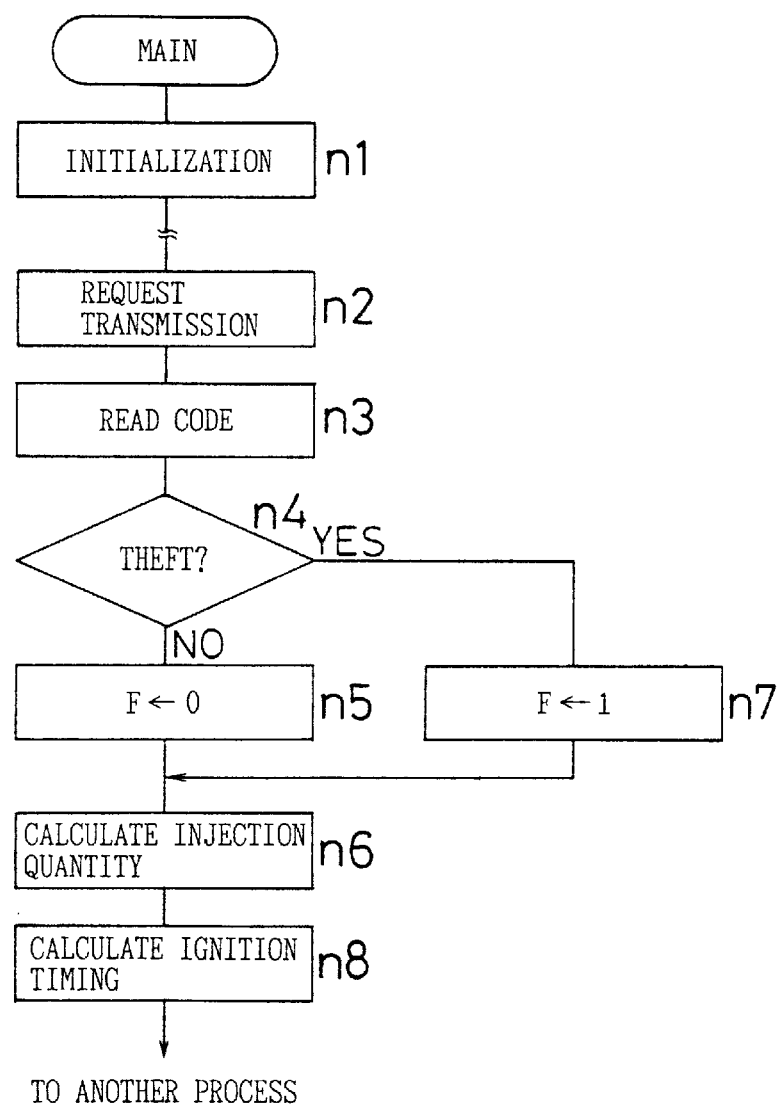
FIG. 8 is a flowchart for explaining a main processing routine for the vehicle control device 111.
Figure 9:
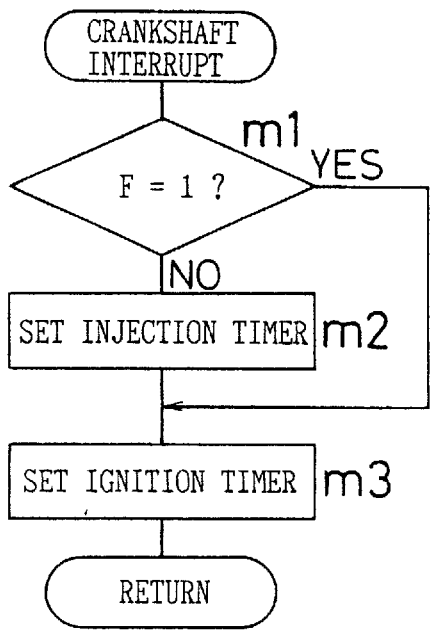
FIG. 9 is a flowchart for explaining an interrupt handling routine for the vehicle control device 111.

FIGS. 8 and 9 are flowcharts for explaining the operation shown in FIG. 7. FIG. 8 shows a main processing routine for the processing circuit 7. In step n1, initialization is performed, including resetting the flag F. In step n2, a transmit request for the code signal is issued to the door lock control unit 6, and in step n3, the code signal transmitted in response to the transmit request is read. In step n4, it is determined whether or not the code signal indicates the detection of a theft. When no theft is detected, the flag F is reset to 0 in step n5, and then the process proceeds to step n6; on the other hand, when a theft is detected, the flag F is set to 1 in step n7, and then the process proceeds to step n6.

In step n6, fuel injection quantity is determined from the flag F reset or set in step n5 or n7, the intake pressure, the internal-combustion engine rotational speed, etc. After determining the ignition timing in step n8, the process proceeds to other processing such as a fail-safe operation.

FIG. 9 is a flowchart for explaining an interruption process which occurs at the rising edge of the crank pulse. In step m1, it is determined whether the flag F is set to 1 or not, and if not, the times T2 and T3 corresponding to the calculated result obtained in step n6 are set in a timer in step m2, and then the process proceeds to step m3. On the other hand, if the flag F is set, the process jumps to step m3 without performing the setting of the timer. In step m3, a timer is set for the ignition timing, after which the process returns to the main routine shown in FIG. 8.

Figure 10:
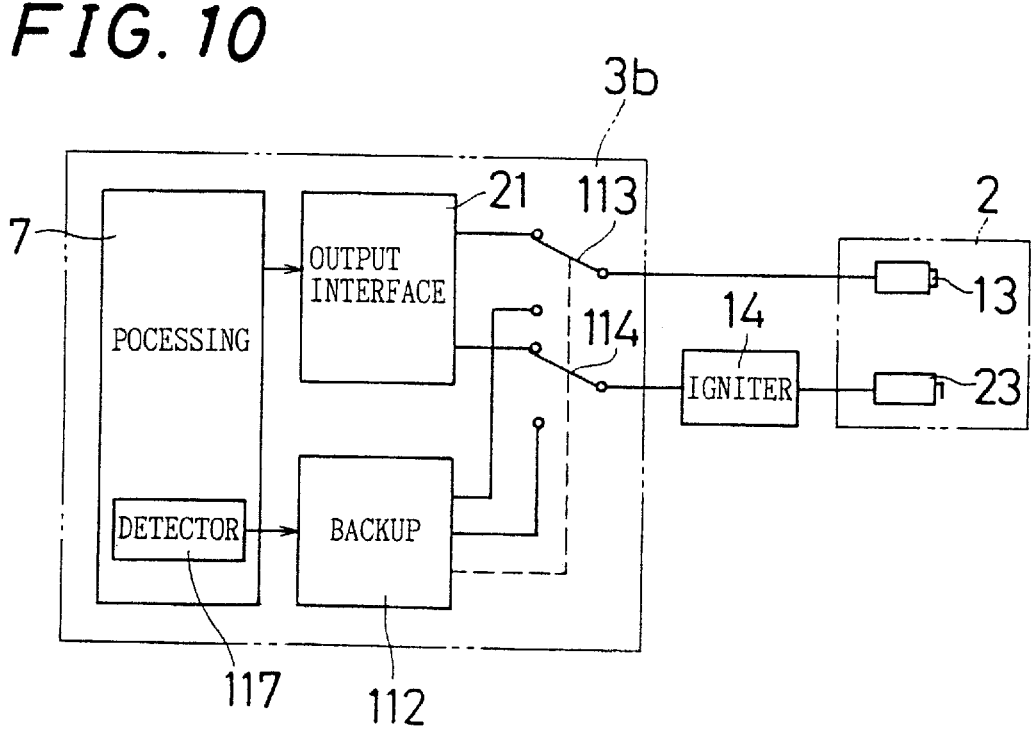
FIG. 10 is a block diagram showing the electrical configuration of an internal-combustion engine control unit 3b of still another embodiment of the invention.

In the above embodiment, the valve opening time T2 of the injection signal is set to 0 when a theft is detected. On the other hand, FIG. 10 shows an internal-combustion engine control unit 3b according to yet another embodiment of the invention, in which a backup integrated circuit 112 is provided in relation to the processing circuit 7; when the internal-combustion engine 2 is being started at low temperatures, when the voltage of the battery 66 has dropped, or when the processing circuit 7 has run away out of control, a detection circuit 117 provided in the processing circuit 7 identifies such a condition, and produces an output to the backup integrated circuit 112 which, in response to the output, outputs a fixed backup injection signal and backup ignition signal to the fuel injection valve 13 and the igniter 14 respectively through switches 113 and 114 instead of the injection signal and ignition signal output from the processing circuit 7. In this construction, if the injection signal is dropped as illustrated in the foregoing embodiment, the backup integrated circuit 112 will be activated.

In such a case, instead of setting the valve opening time T2 to 0 as in the foregoing embodiment, the valve opening time T2 may be chosen short enough that the backup integrated circuit 112 is not activated and that the air-fuel ratio becomes large enough so as not to ignite the air-fuel mixture in the internal-combustion engine 2. This serves to avoid an erroneous activation of the backup operation, and reliably prevents the internal-combustion engine 2 from being started.

As another embodiment of the invention, provisions may be made to stop the output of the ignition signal of FIG. 7(4) that is outputted in response to the crank pulses of FIG. 7(1), or the rising time T4 of the ignition signal may be chosen extremely short to prevent the spark plug 23 from igniting the air-fuel mixture. Alternatively, provisions may be made not to set time T5 in a timer in which T5 should otherwise be set, where T5 is the length of time from the rising of the crank pulse to the rising of the ignition signal.

Figure 11:
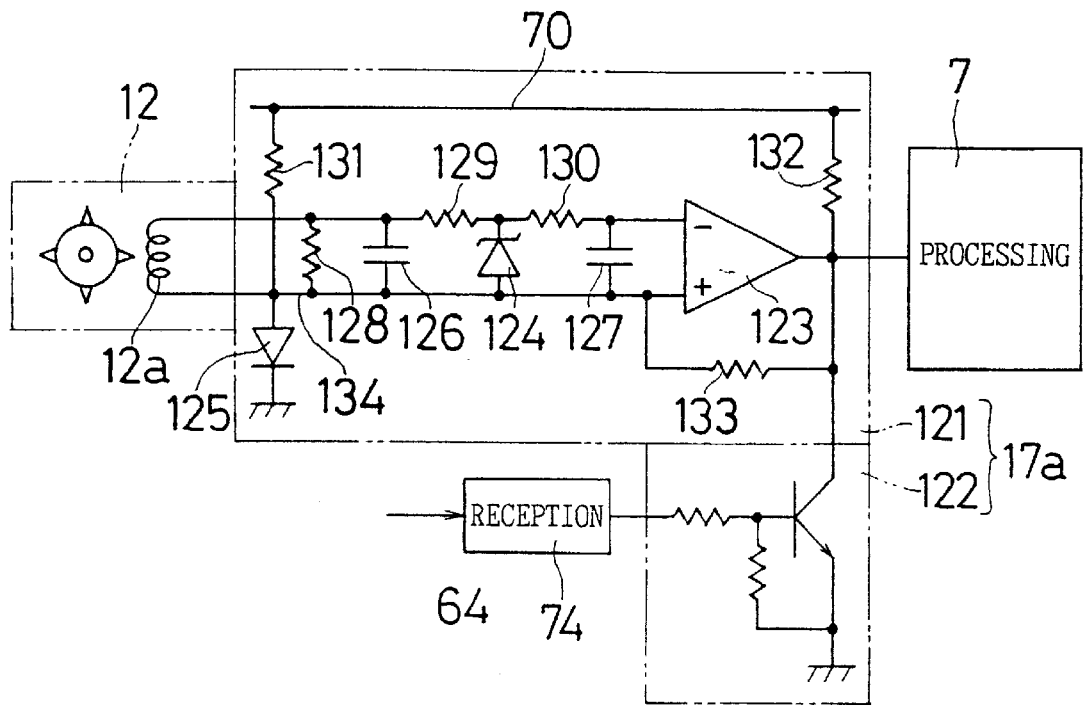
FIG. 11 is an electric circuit diagram showing a detailed configuration of an input interface circuit 17a of another embodiment of the invention.

FIG. 11 is an electric circuit diagram showing an input interface circuit 17a according to another embodiment of the invention. The input interface circuit 17a comprises a waveform shaping circuit 121 and a muting circuit 122. A crank pulse from a magnet pickup 12a in the crank angle detector 12 is inputted to a comparator 123 via a filter circuit consisting of resistors 128 to 130 and capacitors 126 and 127. The output terminal of the comparator 123 is connected to the processing circuit 7, to the power supply line 70 via a pull-up resistor 132, to an input terminal via a feedback resistor 133, and also to ground via the muting circuit 122.

When the detection result indicating the detection of theft is received by the receiver 74, the muting circuit 122 conducts to provide a bypass for the crank pulse which should otherwise be inputted from the comparator 123 to the processing circuit 7. An input line 134 from the magnet pickup 12a is connected to the power supply line 70 via a pull-up resistor 131 to be pulled-up so as to prevent a negative surge from being inputted to the comparator 123. In relation to the line 134, there are also provided a Zener diode 124 for overvoltage protection and a diode 125 for negative surge absorption.

Accordingly, in the above-mentioned configuration, when a theft is detected, since input of the crank pulse from the input interface circuit 17a to the processing circuit is inhibited, the starting of the engine 2 can be thus prevented.

Alternatively, rather than inhibiting the crank pulse from being inputted to the processing circuit 7 as in the above embodiment, provisions may be made to inhibit the reading of the input crank pulse into the processing circuit 7 by means of software.

Figure 12:
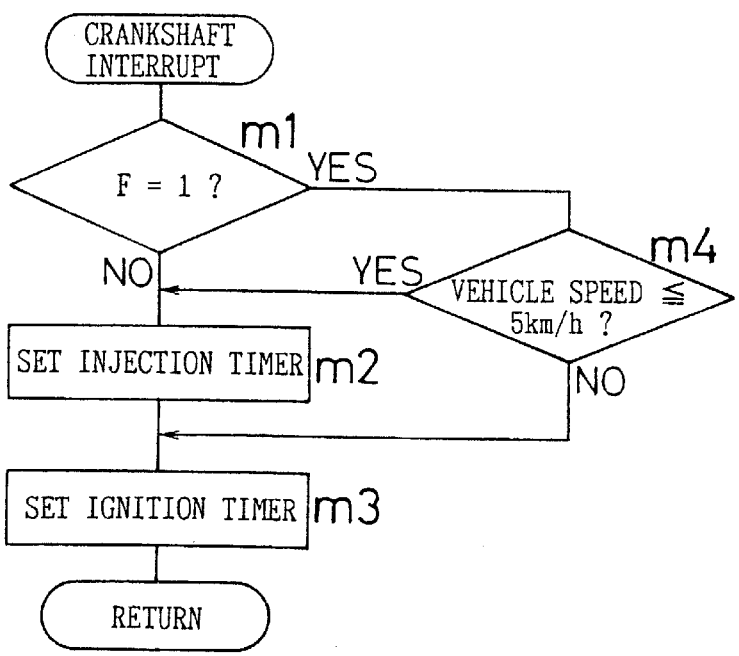
FIG. 12 is a flowchart for explaining the operation of still another embodiment of the invention.

FIG. 12 is a flowchart for explaining the operation of still another embodiment of the invention. This embodiment is similar to the embodiment illustrated in connection with FIG. 9. The difference is that, when setting the injection ON time in relation to the rising of the crank pulse, if the flag F is set to 1 in step m1, the process proceeds to step m4, where it is determined whether or not the vehicle speed inputted from the automatic transmission control unit 5 is equal to or lower than a predetermined value, for example, 5 km/h; if the answer is YES, the process proceeds to step m2 to set the valve opening time T2 and injection ON time T3, and if the answer is NO, the process jumps to step m3 without making the above settings.

In this way, the internal-combustion engine 2 can be stopped with certainty only when the vehicle being stolen is started to be driven away.

Figure 13:
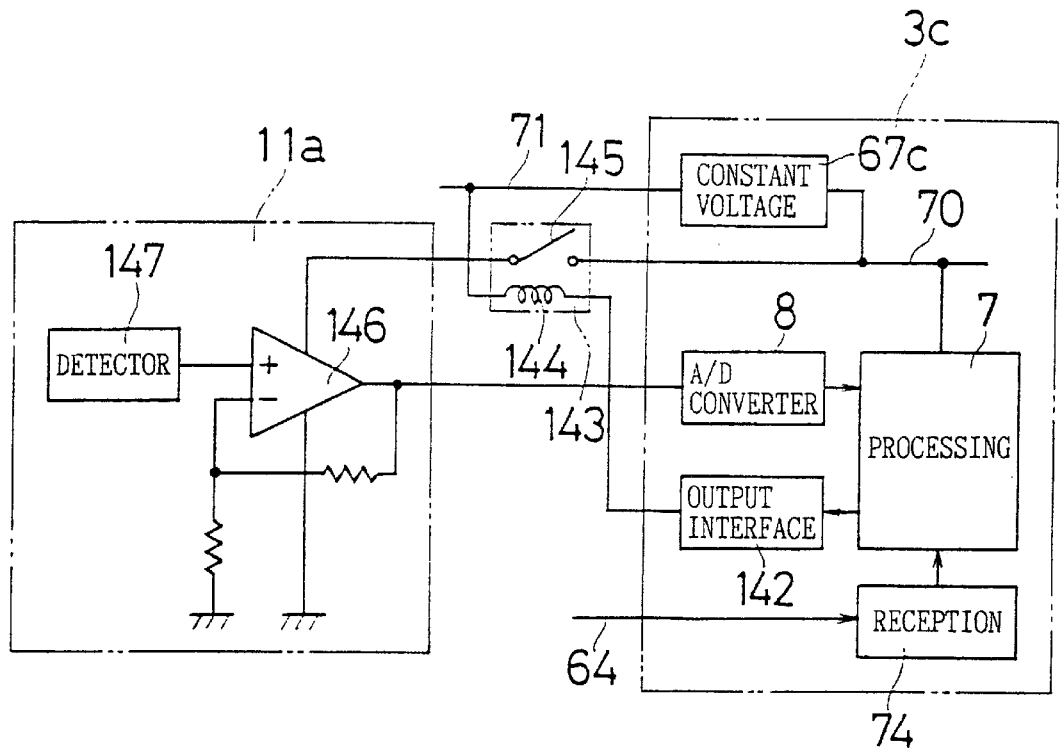
FIG. 13 is a block diagram showing the configuration of an internal-combustion engine control unit 3c of another embodiment of the invention and an intake pressure detector 11a used with the same.

FIG. 13 is a block diagram showing an internal-combustion engine control unit 3c according to another embodiment of the invention and an intake pressure detector 11a used in relation to the same. In the embodiment shown in FIG. 11, when a theft is detected, the crank pulse from the crank angle detector 12 is short-circuited to inhibit the input thereof; in the present embodiment, however, when a theft is detected, the power supply line to the intake pressure detector 11a is cut off, thereby disabling the detector output.

More specifically, when the code signal indicating the detection of a theft is not received by the receiver 74, the processing circuit 7 produces a high level output which is supplied to an output interface circuit 142 containing an output transistor, etc. As a result, the output transistor conducts, and the output interface circuit 142 sinks an exciting current via a relay coil 144 of a relay 143 connected to the power supply line 71. This causes a relay switch 145 to conduct, so that the voltage derived from a constant-voltage circuit 67c onto the power supply line 70 is applied to a differential amplifier 146 in the intake pressure detector 11a. In this way, an output from a detector 147 implemented by a piezoelectric element, impact resistor, or the like, is amplified by the differential amplifier 146 and inputted to the analog/digital converter 8 in the internal-combustion engine control unit 3c.

On the other hand, when a theft is detected, the output from the processing circuit 7 to the output interface circuit 142 goes low, as a result of which the output transistor turns off and the relay switch 145 opens to cut off the power supply to the intake pressure detector 11a. It is thus possible to cut off the power supply to the detector. Alternatively, provisions may be made by means of software to inhibit the reading of the detector output when a theft is detected.

Figure 14:
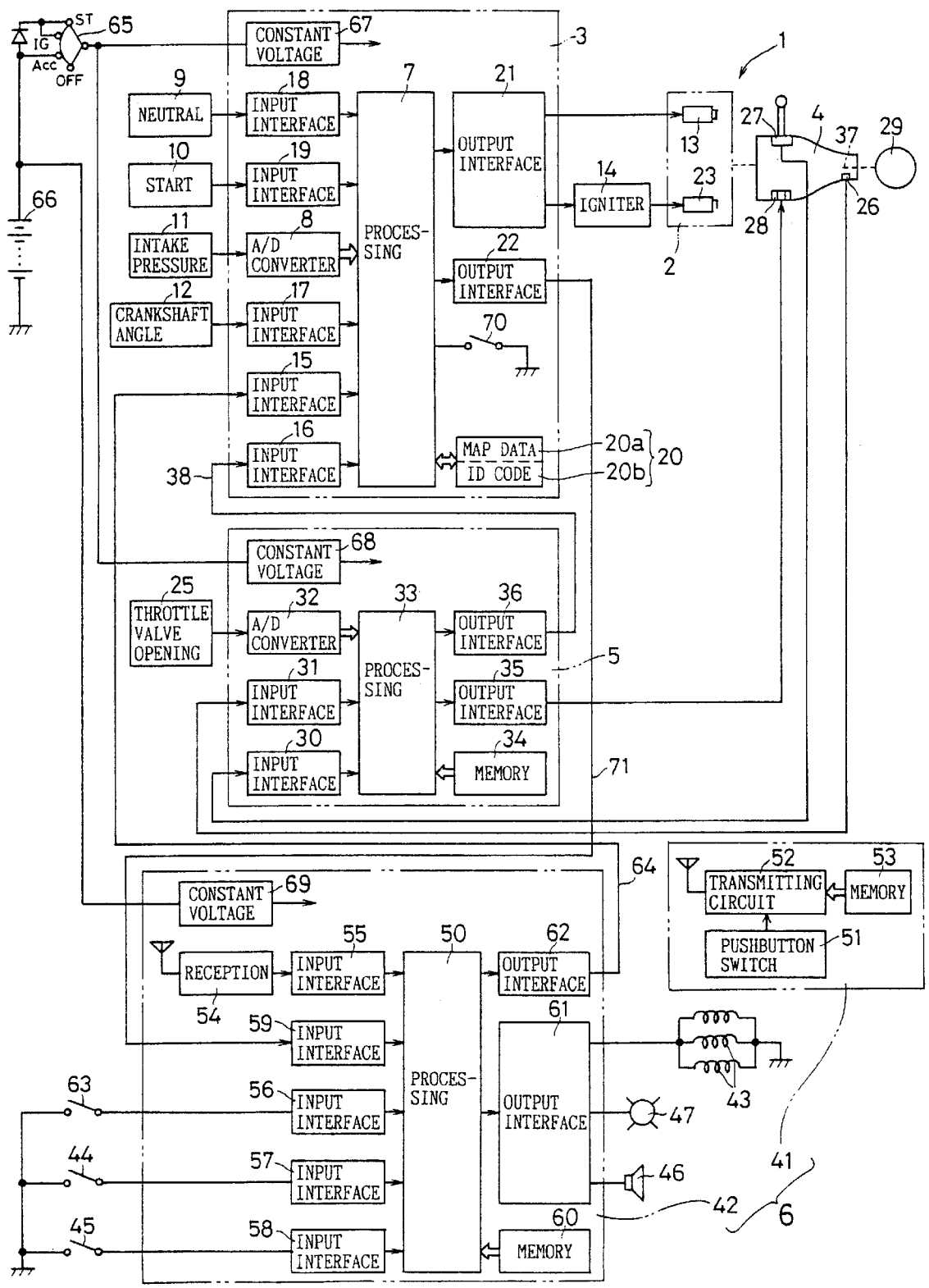
FIG. 14 is a block diagram showing the electrical configuration of a vehicle control device 1 equipped with an anti-theft function of another embodiment of the invention.

FIG. 14 is a block diagram showing the electrical configuration of a vehicle control device 1 equipped with an anti-theft function according to another embodiment of the invention. The vehicle control device 1 comprises an internal-combustion engine control unit 3 for controlling an internal-combustion engine 2, an automatic transmission control unit 5 for controlling an automatic transmission 4, and a door lock control unit 6.

Essentially, the internal-combustion engine control unit 3 computes fuel injection quantity and ignition timing based on the intake pressure of the internal-combustion engine 2 detected by an intake pressure detector 11, the rotational speed of the internal-combustion engine 2 detected by a crank angle detector 12, etc., and thereby drives a fuel injection valve 13 and an igniter 14. The internal-combustion engine control unit 3 comprises input interface circuits 15 to 19, an analog/digital converter 8, a processing circuit 7 implemented by a microcomputer, etc., a memory 20 implemented by an erasable rewritable read-only memory such as a so-called EEPROM or the like, and output interface circuits 21 and 22.

An output from the intake pressure detector 11 is converted by the analog/digital converter 8 into a digital value, which is read into the processing circuit 7. A crank pulse from the crank angle detector 12 is inputted to the processing circuit 7 after being waveform-shaped in the input interface circuit 17. The input interface circuit 15 is provided to receive a signal from the door lock control unit 6, while the input interface 16 is provided to receive a signal from the automatic transmission control unit 5.

Outputs from a neutral switch 9 and a start switch 10 also are inputted to the processing circuit 7 after being waveform-shaped in the input interface circuits 18 and 19, respectively. The neutral switch 9 conducts when the shift lever of the automatic transmission 4 is in the parking or neutral position. The starter switch 10 conducts while the starter motor is being driven.

Based on the detection results from the switches 9, 10 and the detectors 11, 12, the signal from the automatic transmission control unit 5, etc., the processing circuit 7 computes the fuel injection quantity, ignition timing, etc. by referencing map data, etc. stored in a memory area 20a of the memory 20, and thereby controls the valve opening time of the fuel injection valve 13 via the output interface circuit 21 implemented by a power transistor, and also the ignition timing and ignition time of a spark plug 23 via the igniter 14, etc.

In addition to the memory area 20a, the memory 20 has a memory area 20b in which an identification code is stored.

Essentially, the automatic transmission control unit 5 selectively drives a solenoid valve 28 in the automatic transmission 4 in response to the detection results from a throttle valve opening detector 25, a vehicle speed detector 26, and a shift position detector 27, and transmits the drive force from the internal-combustion engine 2 to a drive wheel 29 after reduction by a desired reduction ratio. The automatic transmission control unit 5 comprises input interface circuits 30 and 31, an analog/digital converter 32, a processing circuit 33, a memory 34, and output interface circuits 35 and 36.

The vehicle speed detector 26 detects the rotational speed of a propellershaft 37. Speed pulses from the vehicle speed detector 26 are waveform-shaped in the input interface circuit 31, and then inputted to the processing circuit 33 implemented by a microcomputer, etc. The shift lever position of the automatic transmission 4 is read by the shift position detector 27, and is inputted to the processing circuit 33 via the input interface circuit 30. The detection result from the throttle valve opening detector 25, which is implemented using a potentiometer or the like, is converted by the analog/digital converter 32 into a digital value, which is inputted to the processing circuit 33.

Based on the shift position detected by the shift position detector 27, the throttle valve opening detected by the throttle valve opening detector 25, and the vehicle speed detected by the vehicle speed detector 26, the processing circuit 33 reads optimum gear from shift maps stored in the memory 34 implemented by a read-only memory or the like, and performs control to select the appropriate solenoid valve 28 via the output interface circuit 35 implemented by a power transistor, etc. to achieve shifting into the desired gear.

The processing circuit 33 supplies the previously mentioned signal to the input interface circuit 16 in the internal-combustion engine control unit 3 through the output interface circuit 36 and a line 38. This signal, as will be described later, represents the vehicle speed and shift timing. The internal-combustion engine control unit 3 reduces shift shocks, for example, by temporarily delaying the ignition timing in coordination with the shift timing.

The door lock control unit 6 includes a receiver 42 which essentially drives a door lock actuator 43 in response to a signal from a transmitter 41. When a theft is detected by a switch 44 or 45, the receiver 42 performs an anti-theft action by sounding a horn 46 and flashing a stop signal indicator light 47 at the same time.

The transmitter 41 comprises a pushbutton switch 51, a transmitting circuit 52, and a memory 53. When the pushbutton switch 51 is operated, the transmitting circuit 52 reads the identification code unique to the transmitter 41 from the memory 53 implemented by a read-only memory or the like, and transmits a signal representing the identification code to the receiver 42 via a frequency- or amplitude-modulated wave or via infrared light.

The receiver 42 comprises a receiving circuit 54, input interface circuits 55 to 59, a processing circuit 50, a memory 60, and output interface circuits 61 and 62. The signal representing the identification code and received by the receiving circuit 54 is waveform-shaped in the input interface circuit 55, and then inputted to the processing circuit 50 implemented by a microcomputer, etc. The processing circuit 50 determines whether the identification code matches the identification code of the vehicle stored in the memory 60 implemented by an EEPROM or the like, and when they coincide, drives through the output interface circuit 61 the actuator 43 implemented by an electromagnetic solenoid or the like. That is, when the doors and trunk are in locked position, an unlocking operation is performed, and when they are in unlocked position, a locking operation is performed.

Outputs from the switches 63, 44, and 45, with chattering components removed by the respective input interface circuits 56, 57, and 58, are inputted to the processing circuit 50. With the set switch 63 conducting and thus activating the anti-theft function, when the opening of the hood or door is detected by the hood switch 44 for detecting the opening/closing of the internal-combustion engine hood or by the courtesy switch 45 for detecting the opening/closing of the door, the processing circuit 50 sounds the horn 46 while flashing the stop signal indicator light 47, in the same manner as previously described, thus performing the theft prevention operation.

When a request to read an identification code is inputted to the input interface circuit 59 in the door lock control unit 6 from the output interface circuit 22 in the internal-combustion engine control unit 3 via a line 71, as will be described later, the processing circuit 50 outputs the signal representing the identification code to the input interface 15 in the internal-combustion engine control unit 3 through the output interface circuit 62 and a line 64.

The control units 3, 5, and 6 are also provided with constant-voltage circuits 67, 68, and 69, respectively. Power from a battery 66 is supplied to the constant-voltage circuits 67 and 68 when an ignition key switch 65 is connected to an IG contact or ST contact, while the power from the battery 66 is constantly supplied to the constant-voltage circuit 69, to energize the respective circuits in the control units 3, 5, and 6.

Figure 15:
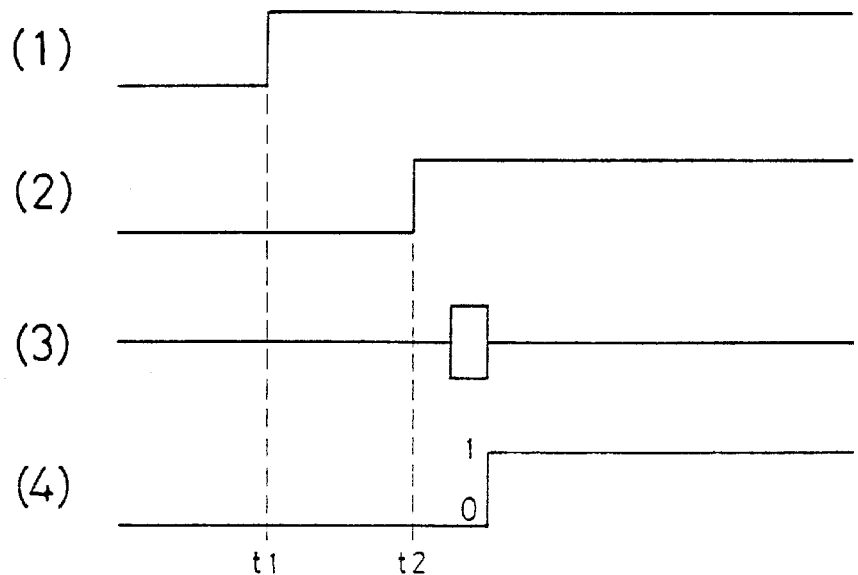
FIG. 15 is a timing chart for explaining the theft prevention operation.

FIG. 15 is a timing chart for explaining the theft prevention operation of the above-configured vehicle control device 1. When the ignition key switch 65 is connected to the IG contact or ST contact at time t1, as shown in FIG. 15(1), the processing circuit 7 initiates an initialization operation at time t2 when the supply voltage settles down, as shown in FIG. 15(2).

As part of the initialization operation, the processing circuit 7 reads the identification code that was transmitted from the transmitter 41 when unlocking the door and stored in the memory 60, via the line 64 in the manner as shown in FIG. 15 (3). The identification code is then compared with the identification code prestored in the memory area 20b of the memory 20, to determine whether they coincide. If they do not coincide, the start inhibit flag F is set to 1, as shown in FIG. 15(4). This inhibits the output, for example, of an injection signal or ignition signal, inhibiting the internal-combustion engine from starting.

In this way, the receiver 42 which receives the identification code transmits the received identification code itself, not the result of the comparison of the identification codes, to the internal-combustion engine control unit 3 via the line 64, and the identification code is compared in the internal-combustion engine control unit 3 with the identification code stored in the memory 20 provided to store control data. Therefore, it is impossible even for persons experienced in vehicle electronics to input the identification code through the line 64 in a pseudo manner, and thus, the vehicle can be reliably prevented from being burgled and driven away.

Figure 16:
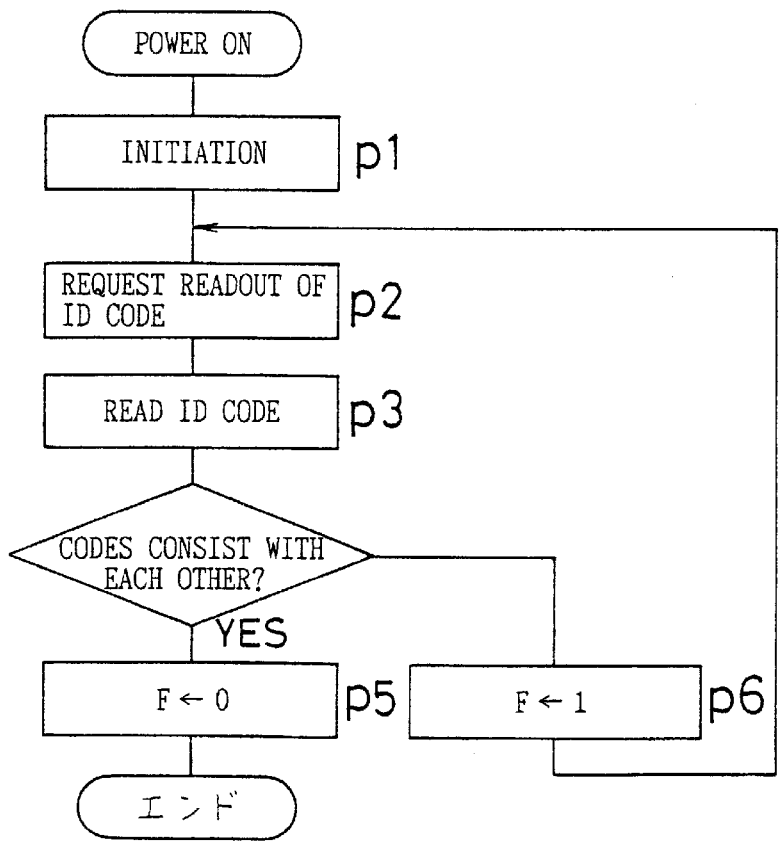
FIG. 16 is a flowchart for FIG. 15.

FIG. 16 is a flowchart for explaining the above-described theft prevention operation. When the ignition key switch 65 conducts and the supply voltage settles, the process proceeds to step p1, where the processing circuit 7 performs the initialization operation. In step p2, a request to read an identification code is sent to the door lock control unit 6 via the line 71. In step p3, the identification code sent from the door lock control unit 6 is read in response to the read request. In step p4, it is determined whether the identification code thus read matches the identification code stored in the memory 20. If they coincide, the flag F is reset to 0 in step p5, upon which the process is terminated. If they do not coincide, the flag F is set to 1 in step p6, after which the process returns to step p2 to re-request the reading out of the identification code.

Figure 17:
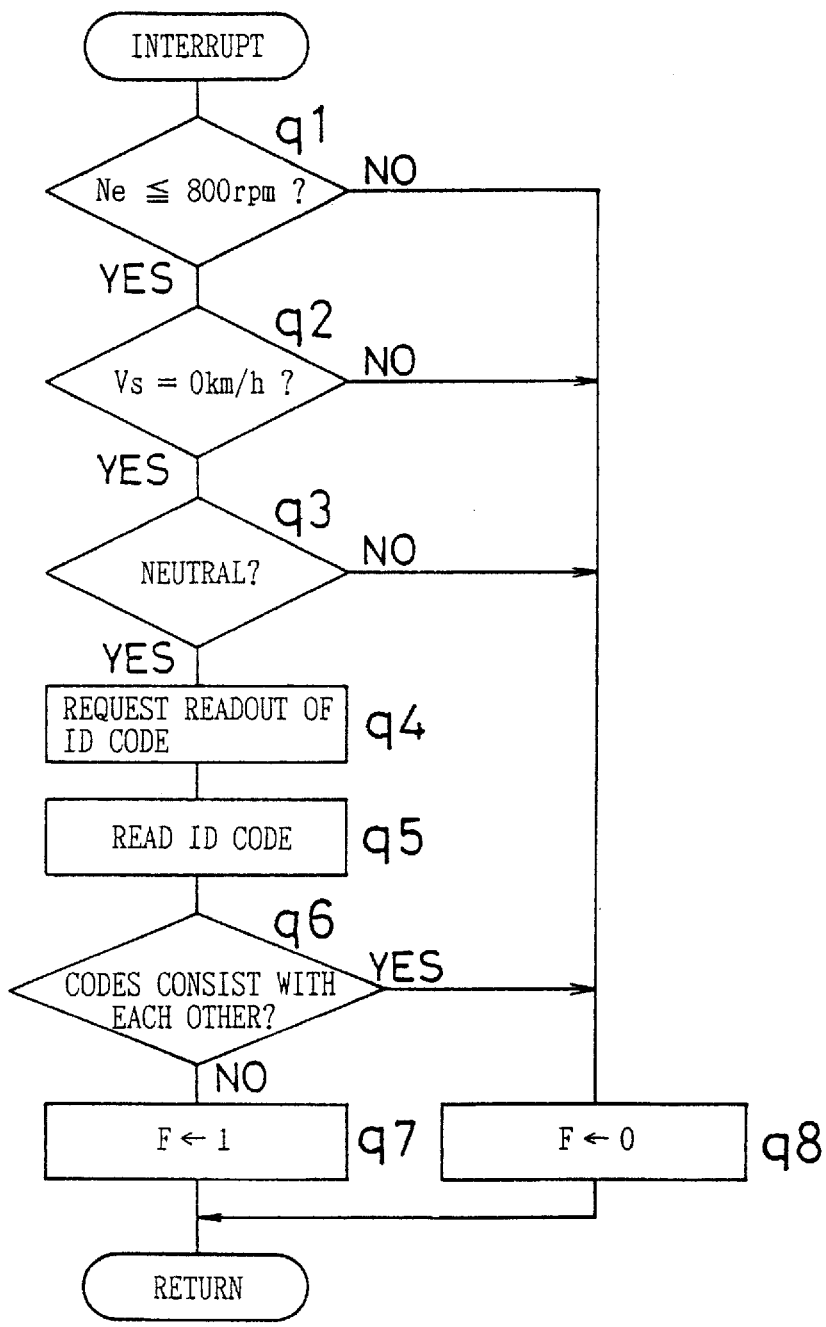
FIG. 17 is a flowchart for explaining a theft prevention operation of another embodiment of the invention.

FIG. 17 is a flowchart for explaining the theft prevention operation of another embodiment of the invention. The operation shown in FIG. 17 is activated by interrupt handling at predetermined intervals of time during running of the internal-combustion engine 2.

In step q1, it is determined, based on the detection result from the crank angle detector 12, whether or not the rotational speed Ne of the internal-combustion engine 2 is equal to or lower than a predetermined value, for example, 800 rpm. If the answer is YES, it is determined in step q2 whether the vehicle speed Vs inputted from the automatic transmission control unit 5 is equal to a predetermined value, for example, 0 km/h; if the answer is YES in step q2, the process further proceeds to step q3, where it is determined, based on the detection result from the neutral detector 9, whether the shift lever of the automatic transmission 4 is in the neutral position, and if YES, the process proceeds to step q4.

When the conditions of steps q1 to q3 have been satisfied, that is, when it is determined that the vehicle is stationary, the process proceeds to step q4 to send an identification code read request to the door lock control unit 6, as in step p2 described above. In step q5, the identification code is read, as in step p3, and in step q6, it is determined, as in step p4, whether the identification code matches the identification code stored in the memory 20. If they do not coincide, the flag F is set to 1 in step q7, and the process is terminated. If they coincide, the flag F is reset to 0 in step q8, and the process is terminated.

When any one of the conditions of steps q1 to q3 has not been satisfied, that is, when there is a possibility that the vehicle is running, the process jumps to step q8 and the flag F is reset to 0.

Accordingly, even if an erroneous judgment was made in the judgment process shown in FIG. 16, correct judgment can be achieved by performing the judgment process shown in FIG. 17 after interruption time has elapsed. The fail-safe function can thus be expanded. Furthermore, since restarting the internal-combustion engine 2 is allowed when the vehicle is running, if the power supply is temporarily interrupted, for example, by turning the ignition key switch 65 off and on when the vehicle is running, the internal-combustion engine 2 can be restarted quickly without having to retransmit the identification code from the transmitter 41.

The processing circuit 7 is also equipped with a test mode terminal 70. The internal-combustion engine control unit 3 can be tested by energizing the test mode terminal 70. That is, the test mode terminal 70 is energized, for example, when performing a delivery inspection at the factory before shipping or during a fault diagnosis at a repair shop. In the present invention, when a predetermined operation is performed in test mode with the test mode terminal 70 energized, the memory 20 is put in a write mode allowing the identification code to be written into the memory area 20b.

More specifically, the write mode is enabled by inputting the OFF condition of the neutral switch 9 and the ON condition of the start switch 10 in a pseudo manner to the input interface circuits 18 and 19, respectively.

Figure 18:
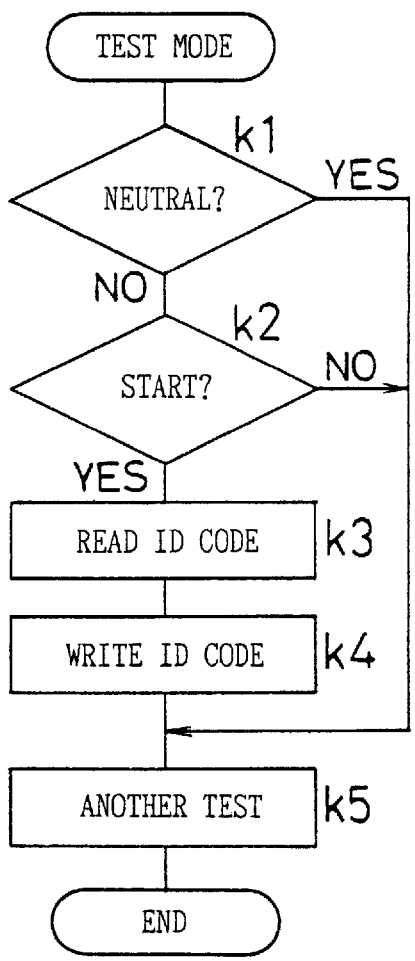
FIG. 18 is a flowchart for explaining a write operation of identification data.

FIG. 18 is a flowchart for explaining the identification code write operation. When the test mode is entered by energizing the test mode terminal 70, the process proceeds to step k1, where it is determined whether the neutral switch 9 is off. If the answer is YES, then it is determined in step k2 whether the start switch 10 is conducting or not; if the answer is YES in step k2, that is, if a combination of switch inputs that cannot occur during actual driving is thus produced in a pseudo manner, the identification code write mode is entered, and the process proceeds to step k3.

In step k3, the identification code is read via the input interface circuit 15, and in the next step k4, the identification code thus read is written into the memory area 20b of the memory 20, after which the process proceeds to step k5. If the condition of step k1 or k2 is not satisfied, the process Jumps to step k5 to proceeds to the next test.

Accordingly, when there arises a need to rewrite the identification code in the event of a failure of the internal-combustion engine control unit 3 or replacement of the transmitter 6 when it is lost or damaged, a new identification code can be written by performing a predetermined operation after activating the test mode; since there is no need to equip the processing circuit 7 with a special terminal for activating the write mode, rewriting of the identification code can be accomplished with a simple construction. Furthermore, inadvertent rewriting by the user, etc. can be prevented, which further enhances the effectiveness of the theft prevention.

POTENTIAL FOR EXPLOITATION IN INDUSTRY

As described above, according to the invention, when a vehicle theft is detected, the function of power supply to control means is disabled by cutting off, for example, the base current of a constant-voltage control transistor in power supply means. Vehicle theft can thus be prevented reliably without the need for large-size components such as a relay used in a system that involves cutting off the control output of an ignition signal, etc.

Preferably, when a theft is detected, the power supply line from the power supply means to the control means is short-circuited to the grounding line, and the power supply function to the control means is disabled by utilizing the overcurrent protection action of the power supply means. In this way, power supply can be cut off using a simple construction by just providing short-circuiting means.

According to the invention, an initializing means is provided in relation to the control means, and when a vehicle theft is detected, the initialization of the control means by the initializing means is inhibited, so that the control means cannot perform calculation of control amounts even after the supply voltage has risen. Vehicle theft can thus be prevented reliably.

According to the invention, when a theft is detected, the output of the injection signal or ignition signal is stopped to the control means that controls at least either the fuel injection quantity or ignition timing of the internal-combustion engine, so that the air-fuel mixture in the combustion chamber does not ignite. In this way, vehicle theft can be prevented reliably.

Furthermore, according to the invention, in a configuration where backup control means for the control means is provided along with the control means that controls at least either the fuel injection quantity or ignition timing of the internal-combustion engine, when a vehicle theft is detected, the control means operates to shorten at least either the injection signal or the ignition signal to a predetermined infinitesimal time; since the injection signal or ignition signal from the control means is not completely stopped, the ignition of the air-fuel mixture in the combustion chamber can be effectively inhibited without activating the backup operation, to prevent vehicle theft in a reliable manner.

Preferably, the above signal shortening operation is performed when the vehicle speed has reached or exceeded a predetermined value after the detection of a vehicle theft. In this way, the anti-theft action can be put into operation only when the vehicle being stolen is started to be driven away.

According to the invention, since the detector is shut off from the control means upon detection of a theft, the detector output is not inputted to the control means, so that the control means cannot perform calculation of control amounts and the internal-combustion engine cannot be started. Vehicle theft can thus be prevented reliably.

According to the invention, the shut-off means is inserted in a power supply line to the detector, and power supply from the power source is stopped upon detection of a theft. By disabling the detector output in this way, the calculation of the control amounts can be rendered impossible.

Also preferably, since the result of the detection as to whether the vehicle is being stolen or not is sent to the control means or the short-circuiting means in the form of a code signal, it is not possible to reproduce such a code signal by simply setting the line from the detection means to the control means or the short-circuiting means to a high level or low level, attempting to input the result of the detection in a pseudo manner. In this way, vehicle theft can be prevented further reliably.

Furthermore, according to the invention, a storage means is provided in relation to the control means for controlling the operating conditions of the internal-combustion engine, and an identification code is stored in the storage means together with the control data; then, an inputted identification code is compared in the control means with the identification code stored in the storage means. That is, the control means itself compares the identification code and verifies its validity, rather than determining whether the starting of the internal-combustion engine should be permitted or not based on the result of the comparison from other comparing means, etc. as in the prior art.

Therefore, it is not possible even for persons experienced in vehicle electronics to produce an input corresponding to the identification code in a pseudo manner and supply it to the control means. This reliably prevents vehicle theft.

Preferably, the comparing operation is performed again when the rotational speed of the internal-combustion engine is not higher than a predetermined value, for example, 800 rpm, the vehicle speed is at a predetermined value, for example, 0 km/h, and the shift lever of the transmission is in the neutral or parking position. Therefore, if an erroneous decision was made and the starting of the internal-combustion engine was not permitted during the operation to start the internal-combustion engine, the internal-combustion engine can be started if the identification codes coincide as a result of the rejudgement made with the above conditions satisfied. The fail-safe function can thus be expanded.

Also preferably, when the vehicle speed is higher than a predetermined value, starting of the internal-combustion engine is permitted regardless of the result of the comparison of the identification codes, allowing the internal-combustion engine to be restarted quickly in the event of an internal-combustion engine stall during driving.

Further preferably, when a combination of parameters that cannot occur during usual operation of the internal-combustion engine is simulated and inputted, the input identification code is directly written into the storage means. Rewriting of the identification code can thus be accomplished using a simple construction without having to provide a switch or the like on the control means. Furthermore, since inadvertent rewriting is prevented, vehicle theft can be prevented reliably.

What is claimed is:

1. An anti-theft device for a vehicle, comprising:

control means for controlling at least one of either a fuel injection quantity or an ignition timing of an internal-combustion engine; and detection means for making the control means stop outputting of at least either of an injection signal and an ignition signal to the internal-combustion engine, when a theft of a vehicle is detected.

2. The anti-theft device for a vehicle of claim 1, wherein the detection means transmits a detection result in the form of a code signal.

3. An anti-theft device for a vehicle, comprising:

control means for controlling at least one of either a fuel injection quantity or an ignition timing of an internal-combustion engine; and backup control means provided in relation to the control means, for supplying a fixed backup injection signal or a fixed backup ignition signal to the internal-combustion engine when it is detected that an injection signal or an ignition signal to the internal-combustion engine has stopped; and detection means for detecting a theft of a vehicle;

wherein, when a theft is detected by the detection means, the control means shortens at least either the injection signal or the ignition signal to a predetermined infinitesimal time.

4. The anti-theft device for a vehicle of claim 3, wherein the detection means transmits a detection result in the form of a code signal.

5. The anti-theft device for a vehicle of claim 3, wherein the control means performs the shortening of the injection signal or the ignition signal when vehicle speed reaches or exceeds a predetermined value after detection of the theft of the vehicle.

6. An anti-theft device for a vehicle, comprising:

control means for controlling operating conditions of an internal-combustion engine:

power supply means, having a semiconductor switch, for stabilizing power from a battery and supplying the power via said semiconductor switch to said control means; and detection means for controlling said semiconductor switch to stop said power supply means from supplying power to said control means when a theft of the vehicle is detected.

7. The anti-theft device for a vehicle of claim 6, wherein the detection means transmits a detection result in the form of a code signal.

8. An anti-theft device for a vehicle, comprising:

control means for controlling operating conditions of an internal-combustion engine;

power supply means for stabilizing power from a battery and supplying the power to the control means;

a power source line connected from the power supply means to the control means;

short circuit means disposed between the power source line and a grounding line for short circuiting the power supply to the control means; and detection means for stopping the power supply means from supplying power to the control means, upon detection of a theft of the vehicle;

wherein, the power supply means is for automatically shutting off the power supply to the control means upon overcurrent detection, and the detection means is for activating the short circuit means to cause generation of an overcurrent, upon detection of a theft of the vehicle.

9. The anti-theft device for a vehicle of claim 8, wherein the detection means transmits a detection result in the form of a code signal.

10. An anti-theft device for a vehicle, comprising:

control means for controlling operation conditions of an internal-combustion engine;

initializing means, for supplying an initialization signal to an initial terminal of said control means at the time when a supply voltage rises and thereby making calculation of control amounts possible; and detection means for inhibiting the supply of the initialization signal from said initialization means in order to inhibit said control means when a theft of the vehicle is detected.

11. The anti-theft device for a vehicle of claim 10, wherein the detection means transmits a detection result in the form of a code signal.

12. An anti-theft device for a vehicle, comprising:

a detector for detecting control parameters of an internal-combustion engine and for outputting a control detection result;

control means for calculating a control amount based on the control detection result from the detector, and for supplying a control output to the internal-combustion engine;

detection means for detecting a theft of the vehicle; and shut-off means interposed between the detector and the control means, for shutting off an output from the detector in order to inhibit the control means when a theft is detected by the detection means.

13. The anti-theft device for a vehicle of claim 12, wherein the detection means transmits a detection result in the form of a code signal.

14. An anti-theft device for a vehicle, comprising:

a detector for detecting control parameter of an internal-combustion engine and for outputting a control detection result;

control means for calculating a control amount based on the control detection result from the detector, and for supplying a control output to the internal-combustion engine;

detection means for detecting a theft of the vehicle; and shut-off means interposed in a power supply line to the detector, for shutting off the power supply line to disable the detector to inhibit the output of the detection result to the control means when a theft is detected by the detection means.

15. The anti-theft device for a vehicle of claim 14, wherein the detection means is for transmitting a detection result in the form of a code signal.

16. An anti-theft device for a vehicle, comprising:

control means for controlling at least one of either a fuel injection quantity or an ignition timing of an internal-combustion engine;

storage means having a storage area for storing data relating to control of the internal-combustion engine and a storage area for storing an identification code; and input means for inputting an identification code to the control means by a predetermined operation;

wherein, when the control means is energized with an attempt to start the internal-combustion engine, the control means compares the identification code inputted from the input means with the identification code stored in the storage means, and when the identification codes do not coincide, the control means inhibits output of at least either one of an injection signal and an ignition signal outputted to the internal-combustion engine.

17. The anti-theft device for a vehicle of claim 16, wherein the control means is for comparing the identification codes again when rotational speed of the internal-combustion engine is not higher than a predetermined value, vehicle speed is not higher than a predetermined value, and a transmission shift lever is in a parking or neutral position.

18. The anti-theft device for a vehicle of claim 17, wherein, when vehicle speed is not lower than a predetermined value, output of at least either one of the injection signal and the ignition signal the internal-combustion engine is permitted regardless of the result of the comparison between the identification codes.

19. The anti-theft device for a vehicle of claim 17, wherein, when parameters to be used to control the internal-combustion engine are inputted in a combination that cannot occur during a usual operation of the internal-combustion engine, the control means writes the identification code inputted from the input means, into the storage means.

20. The anti-theft device for a vehicle of claim 16, wherein, when parameters to be used to control the internal-combustion engine are inputted in a combination that cannot occur during a usual operation of the internal-combustion engine, the control means writes the identification code inputted from the input means, into the storage means.

21. The anti-theft device for a vehicle of claim 16, wherein, when vehicle speed is not lower than a predetermined value, output of at least either one of the injection signal and the ignition signal to the internal-combustion engine is permitted regardless of the result of the comparison between the identification codes.

* * * * *